US 8,800,375 B2

(12) United States Patent
Voskoboinik et al.

(10) Patent No.: US 8,800,375 B2
(45) Date of Patent: Aug. 12, 2014

(54) SWEEP-FREE STIMULATED BRILLOUIN SCATTERING-BASED FIBER OPTICAL SENSING

(75) Inventors: Asher Voskoboinik, Los Angeles, CA (US); Alan E. Willner, Los Angeles, CA (US); Moshe Tur, Tel Aviv (IL)

(73) Assignee: University of Southern California, Los Angeles, CA (US)

( * ) Notice: Subject to any disclaimer, the term of this patent is extended or adjusted under 35 U.S.C. 154(b) by 218 days.

(21) Appl. No.: 13/411,390

(22) Filed: Mar. 2, 2012

(65) Prior Publication Data

US 2013/0025374 A1 Jan. 31, 2013

Related U.S. Application Data

(60) Provisional application No. 61/449,082, filed on Mar. 3, 2011.

(51) Int. Cl.
*G01D 5/32* (2006.01)
(52) U.S. Cl.
USPC .......................................................... 73/655
(58) Field of Classification Search
USPC .................................... 73/655, 657; 356/73.1
See application file for complete search history.

(56) References Cited

U.S. PATENT DOCUMENTS

| 6,813,403 | B2* | 11/2004 | Tennyson | 385/12 |
| 7,515,273 | B2* | 4/2009 | Bernini et al. | 356/477 |
| 7,599,047 | B2* | 10/2009 | Zou et al. | 356/32 |
| 7,719,666 | B2* | 5/2010 | Kishida et al. | 356/73.1 |
| 8,013,986 | B2* | 9/2011 | Hartog | 356/73.1 |
| 8,134,696 | B2* | 3/2012 | Hartog | 356/73.1 |
| 2006/0018586 | A1 | 1/2006 | Kishida | |

FOREIGN PATENT DOCUMENTS

| EP | 2081006 A1 | 7/2009 |
| GB | 2443993 B | 5/2008 |

OTHER PUBLICATIONS

Authorized Officer Otinjac, International Search Report/Written Opinion in International Application No. PCT/US2012/027605, mailed Jul. 17, 2012, 9 pages.
R,W. Boyd, Nonlinear Optics, (Academic Press, 2008), Chap. 9.
M. K. Barnoski, S. D. Personick, "Measurements in Fiber Optics." Proceedings of IEEE, vol. 66, No. 4, 429-441 (1978).
K. Shimizu, T Horiguchi, Y. Koyamada,T. "Coherent self-heterodyne Brillouin OTDR for measurement of Brillouin frequency shift distribution in optical fibers" J. Lightwave Tech., vol. 12, No. 5, 730-736 (1994).

(Continued)

*Primary Examiner* — J M Saint Surin
(74) *Attorney, Agent, or Firm* — Fish & Richardson P.C.

(57) ABSTRACT

Methods and systems used to perform sweep-free stimulated Brillouin scattering-based fiber optical sensing are described. In one aspect, a method includes interrogating different parts of a Brillouin gain spectrum using multiple optical tones in an optical fiber. The interrogating includes sending at least two pump tones into the optical fiber from one end of the optical fiber, such that a frequency spacing between the pump tones is larger than a width of the Brillouin gain spectrum. The interrogating also includes sending at least two probe tones into the optical fiber from another end of the optical fiber, such that a frequency spacing between the probe tones is different from the frequency spacing between the pump tones. The method further includes generating a sensing output based on the interrogating.

30 Claims, 15 Drawing Sheets

(56) References Cited

OTHER PUBLICATIONS

T. Horiguchi, M. Tateda, "BOTDA—Nondestructive Measurement of Single-Mode Optical Fiber Attenuation Characteristics Using Brillouin Interaction : Theory," J. Lightwave Tech., vol. 7. No. 8, 1170-1176 (1989).

M. Tateda, T. Horiguchi, T. Kurashima, K. Ishihara, "First Measurement of Strain Distribution Along Field-Installed Optical Fibers Using Brillouin Spectroscopy," J. Lightwave Tech., vol. 8, No. 9, 1269-1272 (1990).

T. Horiguchi, T. Kurashima, M. Tateda, "A Technique to Measure Distributed Strain in Optical Fiber," IEEE Phot. Tech. Letters, vol. 2, No. 5, 352-354 (1990).

K. Hotate, H. Zuyuan, "Synthesis of optical-coherence function and its applications in distributed and multiplexed optical sensing," J. Lighwave Tech., vol. 24, No. 7. 2541-2557 (2006).

K. Hotate. S. Ong, "Distributed Dynamic Strain Measurement Using a Correlation-Based Brillouin Sensing System," IEEE Phot. Tech. Letters, vol. 15, No. 2, 272-274 (2003).

Virtex-5 Processing Benchmark, National Instruments, http://zone.ni.conydevzone /eda/tut%p/id/7242 , (2009).

L. Thevenaz. M. Nickles. A. Fellay, M. Faccini. P. Robert, "Truly distributed strain and temperature sensing using embedded optical fibers," Proc. SPIE 3330, 301-314 (1998).

X. Bao, M. DeMerchant, A. Brown, and T. Bremner, "Tensile and compressive strain measurement in the lab and field with distributed Brillouin scattering sensor," J. Lightwave Tech., vol. 19, 1698-1704 (2001).

H. Ohno, H. Haruse, M. Kihara, A. Shimada, "Industrial Applications of the BOTDR Optical Fiber Strain Sensor," Invited paper, Optical Fiber Tech.. vol. 7.45-64 (2001).

S. Kwang, K. Hotate, "Distributed Fiber Strain Sensor With 1-kHz Sampling Rate Based on Brillouin Optical Correlation Domain Analysis." IEEE Photon. Tech. Let., vol. 19, No. 23, 1928-1930 (2007).

T. Hofiguchi, K. Shimizu, T. Kurashima, M. Tateda, and Y. Koyamada, J. Lightwave Technol., vol. 13, pp. 1296-1302 (1995).

Bernini, R., Minardo. A., Zeni, U, "Dynamic strain measurement in optical fibers by stimulated Brillouin scattering," Optics Letters, vol. 34, Issue 17, 2613-2615 (2009).

M.J. Damzen, V.I. Vlad, V. Babin, A. Mocofanescu, "Stimulated Brillouin Scattering, Fundamentals and Applications", Institute of Physics Publishing, 2003, Chap. I, 149-150.

Ogusu, K., Li, H., "Brillouin-gain coefficients of chalcogenide glasses," J. Opt. Soc. Am. B, vol. 21. Issue 7. pp. 1302-1304 (2004).

M. Nikles, L. Thevenaz, P. Robert, "Brillouin Gain Spectrum characterization in Single-Mode Optical Fibers," J. of Lighnwave Tech., vol. 15, No. 10, 1842-1851 (1997).

E. Lichtman, A. Friesem, R. Warts, H. Yaffe, "Stimulated Brillouin scattering excited by two pump waves in single-mode fibers," J. Opt. Soc. Am. B 4, No. 9,1397-140-3 (1987).

R. Warts, A. Priesem, E. Lichtman, H, Yaffe, R. Braun, "Nonlinear Effects in Coherent Multichannel Transmission Through Optical Fibers," Proceedings of the IEEE, vol. 78, No. 8, 1344-1368 (1990).

K. Chung, G. Yang, W. Kwong, "Determination of FWM Products in Unequal-Spaced-Channel WDM Lightwave Systems," J. of Lighwave Tech., vol. 18, No. 12, 2113-2122 (2000).

S. Diaz, S. Mafang, M. Lopez-Arno, "A high performance Optical Time-Domain Brillouin Distributed Fiber Sensor," IEEE Sen. J., vol. 8, No. 7, pp. 1268-1272, Jul. 2008.

Bao, X., Liang, H., Dong, Y., Li, W., Li, Y., Chen, L., "Pushing the limits of the distributed Brillouin sensors for the sensing length and the spatial resolution," Proc. SPIE, 7677 (2010).

Chaube, P., Colpitts, B.G., Jagannathan, D., Brown, A.W., "Distributed Fiber-Optic Sensor for Dynamic Strain Measurement," IEEE Sensors Journal, vol. 8, pp. 1067-1072, Jul. 2008.

\* cited by examiner

SWEEP-FREE STIMULATED BRILLOUIN SCATTERING-BASED FIBER OPTICAL SENSING

STATEMENT AS TO FEDERALLY SPONSORED RESEARCH

This invention was made with government support under contract number DSCA-4440145260 awarded by the Defense Security Cooperation Agency (DSCA). The government has certain rights in the invention.

CROSS REFERENCE TO RELATED APPLICATIONS

This application claims the benefit of priority from U.S. provisional application entitled "Brillouin domain simultaneous tone interrogation for faster, sweep-free Brillouin distributed sensing", filed Mar. 3, 2011, Application Ser. No. 61/449,082, the disclosure of which is incorporated by reference in its entirety.

BACKGROUND

This specification relates to sweep-free stimulated Brillouin scattering-based fiber optical sensing.

FIG. 1(a) shows a diagrammatic representation of a Brillouin scattering process. Brillouin scattering is a nonlinear process in which acoustic phonons 120 (that have a frequency $\omega_0$ and are associated with a propagating medium) either spontaneously scatter a forward propagating optical wave 100 (that has a frequency $\omega_L$ and is called "pump") into a backward propagating wave 140 (that has a frequency $\omega_S$ and is called "probe"), or mediate, via a stimulated interaction, power transfer between counter propagating (pump and probe) waves. In either case, the backward propagating probe light 140 has a characteristic Brillouin frequency shift ($\omega_0 = \omega_L - \omega_S$ from that of the pump), which varies with many types of changes in the propagating medium, such as temperature and mechanical stress. Therefore, this Brillouin frequency shift (BFS) can provide information on the surrounding temperature and strain distributions along an optical fiber.

Some Brillouin scattering-based sensors rely on the stimulated Brillouin scattering (SBS) process in which two counter-propagating pump and probe waves generate acoustic waves in an optical fiber, which then transfer optical power from the pump to the probe if the latter frequency is downshifted from that of the pump by the BFS. In some Brillouin scattering-based sensors, the evolution of temperature/strain induced BFS is determined from consecutive recordings of the whole Brillouin gain spectrum (BGS). FIG. 1(b) shows that the BGS can be measured 150 by sweeping the optical frequency of the probe (or the pump) over the entire BGS. The BGS is a Lorentzian-shaped spectrum, having a width of ~30 MHz (FWHM) at 1550 nm in a standard single mode optical fiber (SMF), and is measured as densely as required by a specific application. Consequently, such implementations cannot typically be used in resolving fast, dynamic changes in the measured fiber. In addition, a typical sensitivity of the BFS measurement can be 1 MHz/° C. and 500 MHz/(1% strain). Since the probe signal can be weak when long (tens of kilometers) fibers are interrogated, averaging over multiple measurements is required at each frequency point, thereby further slowing down the frequency scanning rate and the overall measurement speed.

SUMMARY

The systems and techniques described in this specification replace the sweeping 150 of a single probe (or alternatively a pump) laser across all frequencies of the BGS by simultaneous interrogation of the Brillouin gain spectrum (BGS) using multiple optical tones. This sweep-free technology relies on using multiple pump and multiple probe tones, and on arranging the probe tone frequencies so that they interrogate different parts of the BGS. Experimentally reconstructed BGSs, obtained by the multiple tones technologies described in this specification, show agreement with experimental results performed using the frequency sweeping technique 150 described above in connection with FIG. 1(b).

In general, one innovative aspect of the subject matter described in this specification can be embodied as a method of sensing using an optical fiber. The method includes interrogating different parts of a Brillouin gain spectrum using multiple optical tones in the optical fiber. The interrogating includes sending at least two pump tones into the optical fiber from one end of the optical fiber, such that a frequency spacing between the pump tones is larger than a width of the Brillouin gain spectrum. The interrogating also includes sending at least two probe tones into the optical fiber from another end of the optical fiber, such that a frequency spacing between the probe tones is different from the frequency spacing between the pump tones. The method further includes generating a sensing output based on the interrogating.

These and other implementations can include one or more of the following features. In some implementations the frequency spacing between the pump tones can include equal frequency spacings. In other implementations, the frequency spacing between the pump tones can include unequal frequency spacings. The method can also include generating a quantity of pump tones such that the frequency spacing between the pump tones is larger than the width of the Brillouin gain spectrum, and generating the same quantity of probe tones, such that the frequency separation between a probe tone from among the quantity of generated probe tones and a corresponding pump tone is substantially equal to a Brillouin frequency shift, and the frequency spacing between the probe tones is different from the frequency spacing between the pump tones. A spectral resolution of said interrogating can be determined by the quantity of pump probes and a difference between the frequency spacing between the pump tones and the frequency spacing between the probe tones.

The method can also include specifying the quantity of pump tones as a ratio of a specified dynamic range and the difference between the frequency spacing between the pump tones and the frequency spacing between the probe tones. The method can also include determining the quantity of pump tones such that a lowest pump tone frequency is larger than a highest probe tone frequency. Further, the method can include determining the quantity of pump tones such that a total frequency range spanned by the pump tones is less than the Brillouin frequency shift. Furthermore, the method can include determining the quantity of pump tones such that a specified dynamic range for said interrogating is satisfied given the difference between the frequency spacing between the probe tones.

The method can also include ascertaining that a dynamic range for said interrogating exceeds a ratio of the Brillouin frequency shift to the frequency spacing between the pump tones. In response to said ascertaining, the method can include generating the same quantity of probe tones having a second frequency spacing that is different than the initial frequency spacing between the quantity of probe tones, repeating said interrogating different parts of the Brillouin gain spectrum (BGS) using the quantity of pump tones having the second frequency spacing, and generating another sensing output based on said repeated interrogating. The method can also include determining that a given probe tone corresponding to the center of the BGS associated with the repeated interrogating is amplified by another instance of the BGS excited by the pump tone that is shifted by n pump frequency spacings from an instance of the BGS excited by the pump tone corresponding to the given probe tone. In response to said determining, the method can include shifting a Brillouin gain spectrum corresponding to the initial interrogating by n times a difference between the initial frequency spacing and the second frequency spacing.

In some implementations, sending the at least two pump tones into the optical fiber from one end of the optical fiber can include simultaneously sending the quantity of pump tones as a pump signal.

In other implementations, the method can include pulsing the pump signal to spatially-resolve said interrogating. For example, generating the sensing output can include down shifting output of the interrogating; digitizing the down shifted output of the interrogating; dividing the digitized output into multiple segments corresponding to pulses of the pump signal; for each of the segments, averaging the digitized output to obtain an averaged output for each of the multiple segments; applying a Fourier transform to the averaged output of each of the multiple segments; determining a Brillouin frequency shift for each of the transformed multiple segments; and aggregating the determined Brillouin frequency shifts of the multiple segments into the sensing output.

As another example, generating the sensing output can include down shifting output of the interrogating; digitizing the down shifted output of the interrogating; dividing the digitized output into multiple segments corresponding to pulses of the pump signal; for each of the segments, averaging the digitized output to obtain an averaged output for each of the multiple segments; digitally filtering N instances of the averaged output to obtain N filtered outputs for each of the multiple segments; determining a Brillouin frequency shift as the largest of the N filtered outputs for each of the multiple segments; and aggregating the determined Brillouin frequency shifts of the multiple segments into the sensing output.

As yet another example, generating the sensing output can include down shifting output of the interrogating; RF filtering N instances of the down shifted output of the interrogating to obtain N filtered signals corresponding to the probe tones; digitizing the obtained N filtered signals; dividing the N digitized filtered signals into multiple segments corresponding to pulses of the pump signal; for each of the segments, averaging the N digitized filtered signals to obtain N averaged outputs for each of the multiple segments; determining a Brillouin frequency shift as the largest of the N averaged outputs for each of the multiple segments; and aggregating the determined Brillouin frequency shifts of the multiple segments into the sensing output.

As some another example, generating the sensing output can include down shifting N instances of output of the interrogating by using respective different local optical oscillators to obtain N downshifted outputs of the interrogating corresponding to the probe tones; low-pass filtering the N downshifted outputs of the interrogating to obtain N filtered signals; digitizing the obtained N filtered signals; dividing the N digitized filtered signals into multiple segments corresponding to pulses of the pump signal; for each of the segments, averaging the N digitized filtered signals to obtain N averaged outputs for each of the multiple segments; determining a Brillouin frequency shift as the largest of the N averaged outputs for each of the multiple segments; and aggregating the determined Brillouin frequency shifts of the multiple segments into the sensing output.

In some implementations, generating the sensing output can include generating a pump signal including a pulse that has sub-pulses riding on respective ones of the generated quantity of pump tones, such that a sub-pulse period of each of the sub-pulses is substantially equal to a time of round-trip propagation of the sub-pulse through the optical fiber, and the sub-pulses of the pulse are sequenced such that said sending the at least two pump tones into the optical fiber comprises simultaneously sending two of the sub-pulses that correspond to pulse tone frequencies that are symmetric with respect to an optical carrier.

In general, another innovative aspect of the subject matter described in this specification can be embodied as a system of sensing using an optical fiber. The system includes a laser source to produce an optical carrier signal having a carrier frequency; an optical splitter to split the optical carrier signal into a first optical signal at the carrier frequency that propagates through a probe arm and a second optical signal at the carrier frequency that propagates through a pump arm, such that the pump arm is arranged to have an end at the optical splitter and another end at a second end of the optical fiber, and the probe arm is arranged to have an end at the optical splitter and another end at a first end of the optical fiber; a waveform generator to produce first and second RF comb signals, such that frequency spacings of the first RF comb signal are different from frequency spacings of the second RF comb signal, and the frequency spacings of both RF comb signals are larger than a width of a Brillouin gain spectrum in the optical fiber; an optical modulator of the pump arm to modulate the second optical signal using the second RF comb signal and to generate a pump signal including optical pump tones riding on the carrier frequency and corresponding to the second RF comb signal, such that the generated pump signal travels through the pump arm to the second end of the optical fiber, propagates through the optical fiber and excites instances of the Brillouin gain spectrum that are shifted by a Brillouin frequency shift (BFS) of the optical fiber from the corresponding optical pump tones of the pump signal; a mixer including a local oscillator (LO) tuned to the approximate BFS of the optical fiber to up-convert the first RF comb signal into an intermediate frequency (IF) comb signal including IF comb tones riding on the Brillouin frequency shift and corresponding to the first RF comb signal; an optical modulator of the probe arm to modulate the first optical signal using the IF comb signal and to generate a probe signal including optical probe tones riding on the carrier frequency downshifted by the approximate BFS and corresponding to the IF comb signal, such that the generated probe signal travels through the probe arm to the first end of the optical fiber, propagates through the optical fiber, probes the instances of the Brillouin gain spectrum excited in the optical fiber by the optical pump tones of the pump signal, and exits at the second end of the optical fiber as an amplified probe signal including amplified probe tones riding on the downshifted carrier frequency and corresponding to the IF comb signal; an optical circulator to extract the amplified probe signal from the second end of the optical fiber; and a detection system to detect the amplified probe signal extracted by the circulator from the second end of the optical fiber, the detection system being configured to convert the detected amplified probe signal to a data signal corresponding to the Brillouin gain spectrum associated with the optical fiber.

These and other implementations can include one or more of the following features. In some implementations, the second RF comb signal can be generated such that the second frequency spacing between the optical pump tones comprises equal frequency spacings. In some implementations, the second RF comb signal can be generated such that the second frequency spacing between the optical pump tones comprises unequal frequency spacings. A spectral resolution of the system can be determined by a quantity of pump probes and a difference between the second frequency spacing between the pump tones and the first frequency spacing between the probe tones. A quantity of pump tones can be determined as a ratio of a specified dynamic range and the difference between the second frequency spacing between the pump tones and the first frequency spacing between the probe tones. A quantity of pump tones can be specified such that the lowest pump tone frequency is larger than the highest probe tone frequency. A quantity of pump tones can be specified such that a total frequency range spanned by the pump tones is less than the Brillouin frequency shift.

In some implementations, the optical pump tones of the pump signal can simultaneously excite the instances of the Brillouin gain spectrum in the optical fiber.

In other implementations, the pump signal can be pulsed to spatially-resolve the Brillouin gain spectrum associated with the optical fiber. In the latter implementations, for example, the detection system can include a detector and a local oscillator to down shift the detected amplified probe signal; analog-to-digital convertor to digitize the down shifted amplified probe signal; and processing electronics. The processing electronics can be configured to divide the digitized output into multiple segments corresponding to pulses of the pump signal, for each of the multiple segments, average the digitized output to obtain an averaged output for each of the multiple segments, apply a Fourier transform to the averaged output of each of the multiple segments, determine a value of the Brillouin frequency shift for each of the transformed multiple segments, and aggregate the determined Brillouin frequency shifts of the multiple segments into the data signal.

As another example, the detection system can include a detector and a local oscillator to down shift the detected amplified probe signal; analog-to-digital convertor to digitize the down shifted amplified probe signal; and processing electronics. The processing electronics can be configured to divide the digitized output into multiple segments corresponding to pulses of the pump signal, for each of the multiple segments, average the digitized output to obtain an averaged output for each of the multiple segments, digitally filter N instances of the averaged output to obtain N filtered outputs for each of the multiple segments, determine a Brillouin frequency shift as the largest of the N filtered outputs for each of the multiple segments, and aggregate the determined Brillouin frequency shift's of the multiple segments into the data signal.

As yet another example, the detection system can include a detector and a local oscillator to down shift the detected amplified probe signal; N RF filters to filter N instances of the down shifted amplified probe signal to obtain N filtered signals corresponding to the probe tones; analog-to-digital convertor to digitize the obtained N filtered signals; and processing electronics. The processing electronics can be configured to divide the N digitized filtered signals into multiple segments corresponding to pulses of the pump signal, for each of the multiple segments, average the N digitized filtered signals to obtain N averaged outputs for each of the multiple segments, determine a Brillouin frequency shift as the largest of the N averaged outputs for each of the multiple segments, and aggregate the determined Brillouin frequency shifts of the multiple segments into the data signal.

As another example, the detection system can include N local oscillators tuned to respective probe tone frequencies; N detectors to down shift, using the N local oscillators, N instances of the detected amplified probe signal to obtain N downshifted output signals; N low-pass filters to filter the N down shifted output signals to obtain N filtered signals corresponding to the probe tones; analog-to-digital convertor to digitize the obtained N filtered signals; and processing electronics. The processing electronics can be configured to divide the N digitized filtered signals into multiple segments corresponding to pulses of the pump signal, for each of the multiple segments, average the N digitized filtered signals to obtain N averaged outputs for each of the multiple segments, determine a Brillouin frequency shift as the largest of the N averaged outputs for each of the multiple segments, and aggregate the determined Brillouin frequency shifts of the multiple segments into the data signal.

In some implementations, the waveform generator can produce a pulse that includes sub-pulses riding on respective ones of the optical pump tones, such that a sub-pulse period of each of the sub-pulses is substantially equal to a round-trip time of propagation of the sub-pulse through the optical fiber, and the sub-pulses of the pulse are sequenced such that two optical pump tones at-a-time excite two instances of the Brillouin gain spectrum in the optical fiber, where the two of the sub-pulses have pulse tone frequencies that are symmetric with respect to the optical carrier.

Particular embodiments of the subject matter described in this specification can be implemented so as to realize one or more of the following potential advantages. Brillouin-based optical fiber sensing can be used to monitor structural and environmental changes. A Brillouin sensor system based on the described technology can probe multiple different optical frequencies simultaneously in order to potentially increase the overall speed of the spectral measurements, thereby enabling the measurement of fast dynamic changes of interest, such as mechanical vibrations. The described techniques can potentially reduce the sensing time, since all frequency points of the BGS can be simultaneously accessed. For example, the sweep-free SBS-based optical fiber sensing technique described in this specification is potentially faster than the frequency sweeping technique 150 by a factor equal to the number of pump-probe pairs used for the BGS reconstruction, since each pair replaces one sweeping step in the frequency sweeping technique 150. For measurements where the temperature or strain excitation has large dynamic range (e.g., it can cause large changes in BFS), the sweep-free SBS-based sensing that uses N pump tones with a first frequency spacing can be repeated, e.g., once, using the N pump tones with second frequency spacing to extend the dynamic range of the sweep-free SBS-based sensing process. In this manner, the sweep-free SBS-based sensing with extended dynamic range can achieve a speed advantage which exceeds order of N over sensing techniques that use sequential scanning.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
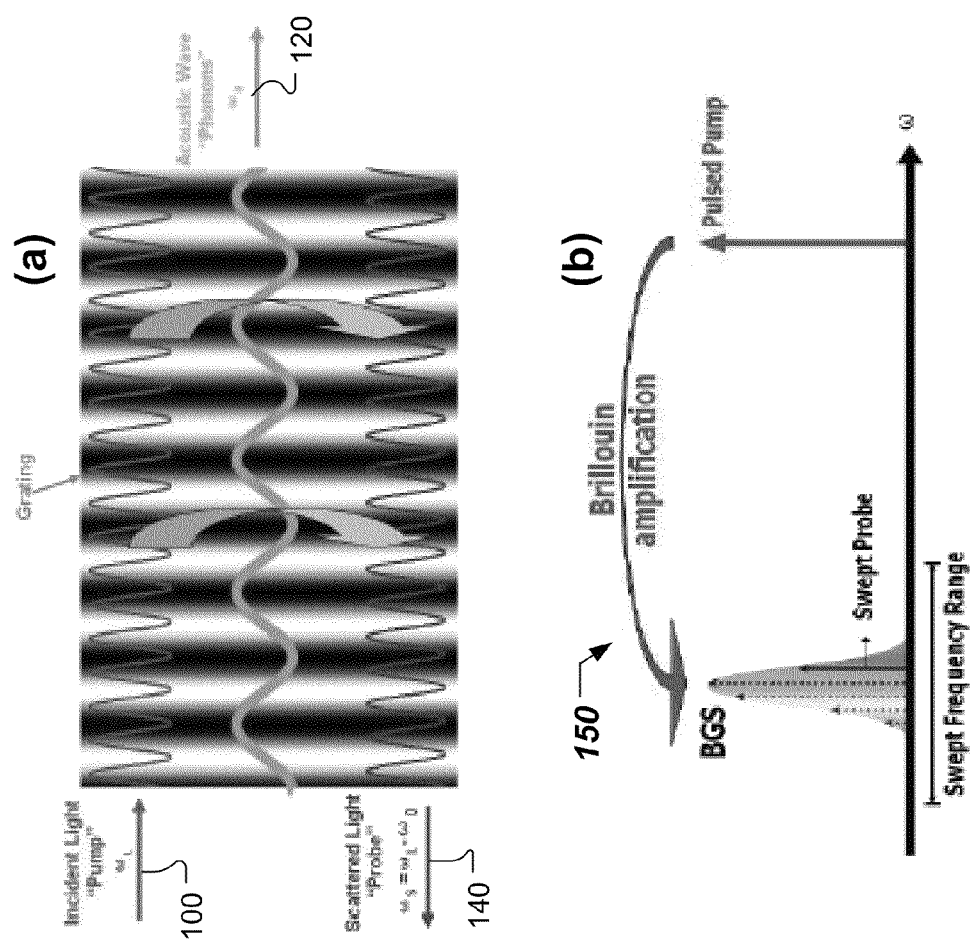
FIG. 1(a) shows a diagrammatic representation of a Brillouin scattering process.
FIG. 1(b) shows a measurement of the Brillouin gain spectrum (BGS) by sweeping the optical frequency of probe light over the entire BGS.
Figure 2:
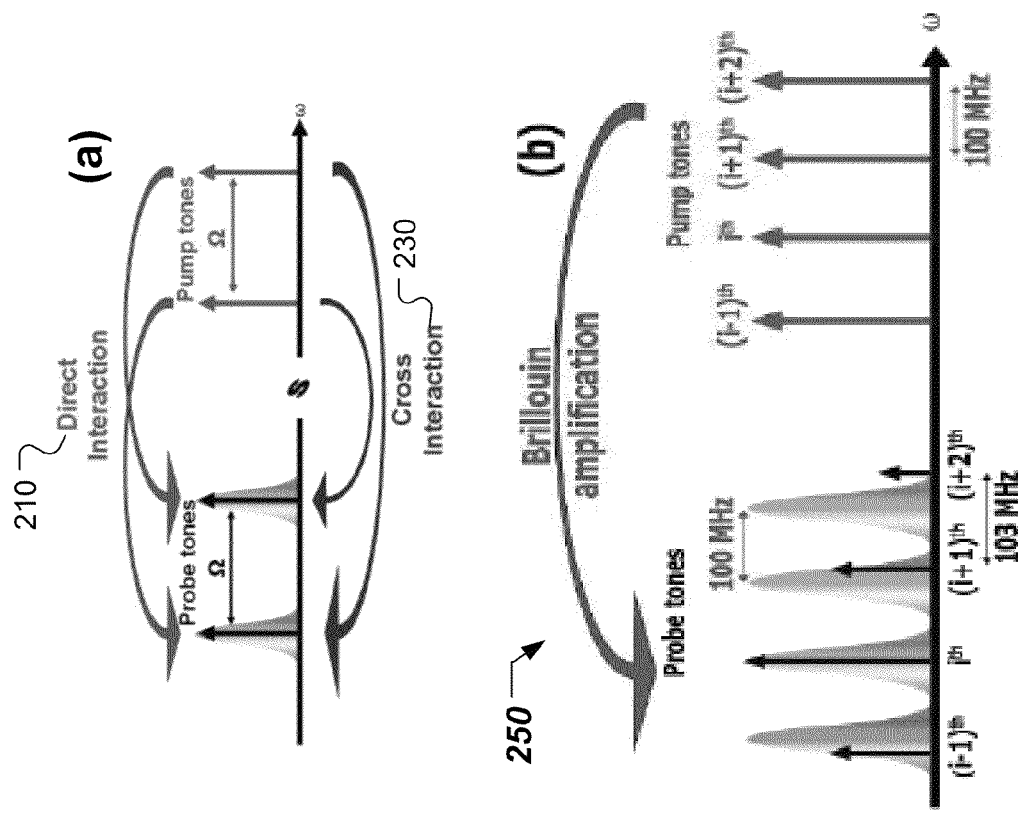
FIG. 2(a) shows a diagrammatic representation of direct and cross interactions for a Brillouin scattering process.
FIG. 2(b) shows an example of a sweep-free stimulated Brillouin scattering (SBS)-based optical fiber sensing technique.

FIG. 2(a) shows two pump tones that generate two Brillouin gain spectra (BGSs), whose center frequencies are shifted from the pump tones by corresponding Brillouin frequency shifts (BFSs). Each of the two BGSs can be the result of direct 210 and cross 230 interactions of the two pump tones. The low frequency pump tone contributes via direct interactions 210 to generation of the corresponding low frequency BGS, and can contribute via cross interactions 230 to generation of the high frequency BGS (corresponding to the high frequency pump tone). Similarly, the high frequency pump tone contributes via direct interactions 210 to the generation of the corresponding high frequency BGS, and can contribute via cross interactions 230 to the generation of the low frequency BGS (corresponding to the low frequency pump tone). To avoid the cross interactions 230 between the high and low frequency pump-probe pairs, the pump tones spacing can be configured to be significantly larger than the width of the BGS. For instance, the BGS can have a width of ~30 MHz (FWHM) at 1550 nm in a single mode optical fiber (SMF). In this case, if the spacing between the low and high pump tones is 100 MHz, the resulting BGSs are generated only by direct interactions 210, and the pump tones generate their corresponding BGSs independently from each other.

FIG. 2(b) shows an example of a sweep-free SBS-based optical fiber sensing technique 250. A quantity N of pump tones $\{\omega_0(i), i=1, \ldots, N\}$ generate N corresponding BGSs, whose center frequencies, $\{\Omega_B(i), i=1, \ldots, N\}$, are shifted from the pump tones by the corresponding BFSs: $\{\Delta\Omega_B(i), i=1, \ldots, N\}$, given by:

$$\Delta\Omega_B(i) = \frac{2\pi(i)V_s\omega_0(i)}{c}, \quad (1)$$

where $\omega_0(i)$ is the optical frequency of the $i^{th}$ pump tone, $n(i)$ is the refractive index at $\omega_0(i)$, c is speed of light in a vacuum, and $V_S$ is the speed of sound in the fiber. All BFSs $\{\Delta\Omega_B(i), =1, \ldots, N\}$ can be considered identical around 11 GHz for SMF at 1550 nm. All BGSs have a Lorentzian shape with a FWHM width of:

$$\Delta\omega_B(i) \propto [\Delta\Omega_B(i)]^2 = const[\omega_0(i)]^2 \xrightarrow[@1550nm]{SMF} 1.27 \cdot 10^{-22}[\omega_0(i)]^2 \quad (2)$$

At 1550 nm, Equation (2) gives $\Delta\omega_B(i)=2\pi \cdot 30$ MHz for standard SMF. As long as $\{\omega_0(i), i=1, \ldots, N\}$ span a range of less than 10 GHz, the BFSs in the set $\{\Delta\Omega_B(i), i=1, \ldots, N\}$ do not vary by more than a few KHz. To avoid interactions between neighboring pump-probe pairs, the pump tones spacing should be significantly larger than the width of the BGS, as described above in connection with FIG. 2(a). If it were not for other nonlinear effects in the fiber, fixed pump tone spacing can be chosen, e.g., 100 MHz, as depicted in FIG. 2(b), to avoid such cross interactions.

In addition to the pump tones, a similar number of probe tones are simultaneously launched into the fiber from its opposite side, downshifted by approximately the value of the BFS, and such that the frequency spacing between probe tones is slightly different from the frequency spacing between the pump tones. The spacing between the probe tones can be either larger or smaller than the spacing between the pump tones. In this manner, each probe tone is located in a different region of the BGS of the corresponding pump tone. In some implementations, the lowest frequency probe tone is downshifted from the lowest frequency pump tone by about the highest BFS expected in the application. The probe tone spacing is then chosen to be somewhat larger than that of the pump tones, such that if the lowest frequency probe tone falls to the low frequency side of the lowest frequency BGS, e.g., the $(i-1)^{th}$ probe in FIG. 2(b), the other probe tones, $i^{th}$, $(i+1)^{th}, (i+2)^{th}, \ldots$, successively sample different regions of the corresponding BGSs, until the whole BGS is mapped. In the example illustrated in FIG. 2(b), the spacing of the probe tones is 103 MHz so that the frequency difference between the pump and probe tones of a given pump-probe pair decreases by 3 MHz from the $i^{th}$ to the $(i+1)^{th}$ pair. Through the SBS interaction, the $i^{th}$ probe tone is amplified by the $i^{th}$ pump tone, and the gains experienced by the various probe tones depend on their proximity to the center of the BGS, with the closest one having the highest gain. As the individual gains of the many probe tones can be recorded simultaneously, the BGS can be reconstructed in a single measurement (excluding averaging), without the need for frequency sweeping 150. The number of pairs of pump-probe tones used and the frequency spacing between each pair determine the spectral resolution of BGS reconstruction.

Accordingly, the higher the number of pairs of pump-probe tones, the higher is the spectral resolution of the BGS reconstruction. In addition, the sweep-free SBS-based optical fiber sensing technique 250 described in this specification is potentially faster than the frequency sweeping technique 150 by a factor equal to the number of pump-probe pairs used for the BGS reconstruction, since each pair replaces one sweeping step in the frequency sweeping technique 150.

The choice of the number of tones, N, their spacing, $\Delta v_{Pump}$, and the additional incremental spacing of the probe tones, $\delta v_{Probe} = \Delta v_{Probe} - \Delta v_{Pump}$, depends on several considerations: (i) The total frequency range spanned by the tones, $N\Delta v_{Pump}$, should not exceed the BFS (e.g., ~11 GHz for a standard SMF) in order to avoid disturbing effects of the lowest frequency pump tone on the highest frequency probe tone. While larger frequency spans cause the BFS to slightly change as a result of its dependence on the optical frequency, this dependence can be corrected for in the signal processing stage; (ii) the inter-tone spacing, $\Delta v_{Pump}$, should be larger than the width of the BGS at its bottom (e.g., ~60 MHz). Otherwise, a probe tone experiences gain from more than one BGS; (iii) in some implementations of the technique, the sweep-free dynamic range for strain or temperature measurements is given by $N\delta v_{Probe}$ [Hz]. While $N\delta v_{Probe}$=100 MHz may be sufficient for temperature studies, practical strain scenarios may call for $N\delta v_{Probe}$ on the order of GHz's. With N being limited by the two previous considerations, wider dynamic range can be achieved by a larger $\delta v_{Probe}$, but only at the expense of the obtained frequency resolution, potentially resulting in limited resolution of the strain/temperature measurement. On the other hand, for proper Lorentzian fitting, $\delta v_{Probe}$ typically cannot be made too small since the sweep-free range $N\delta v_{Probe}$ should be at least of the order of the natural width of the BGS, which is ~30 MHz or larger for SMF, as determined by the inverse of the width of the pump pulse.

In some implementations, the sweep free interrogation technology 250 using equally spaced tones, as described above in connection with FIG. 2(b), can be modified in order to combat nonlinear effects, which tend to create intermodulation products, collocated with legitimate tones. Accordingly, unequal frequency spacings for both the pump and probe tones can be used instead of the equally spaced tones.

As described above in connection with FIG. 2(b), the sweep-free SBS sensing 250 is based on measuring the Lorentzian BGS using many frequency-shifted replicas of the BGS, where each replica contributes one measurement point. Within the framework of the described technology, the shifted BGSs, excited by the multiple pump tones, are assumed to have the same shape and width. As described above, the span of pump tones should not exceed 11 GHz, and shape and width variations within this range can be neglected.

Based on Equation (1), the derivative of the BFS with respect to the pump tone frequency $w_0$ is given by:

$$\frac{d\Omega_B}{d\omega_0} = \frac{2V_s}{c}\left(n + \omega_0 \frac{dn}{d\omega_0}\right) = \frac{2V_z n_g}{c} \approx 6 \cdot 10^{-5} \quad (3)$$

Thus, under the worst case scenario, where the whole allowable 11 GHz range is populated with pump tones, $\Omega_B$ may vary by ~300 KHz. If this variation is ignored, an error of up to 0.3° C. and/or 10 microstrains may be present in temperature/strain measurements. If this source of error is the dominant one, more complex processing of the data can take into account the variation within $\{\Omega_B(i), i=1, \ldots, N\}$, eliminating its effect on the accuracy of the measurement.

Figure 3:
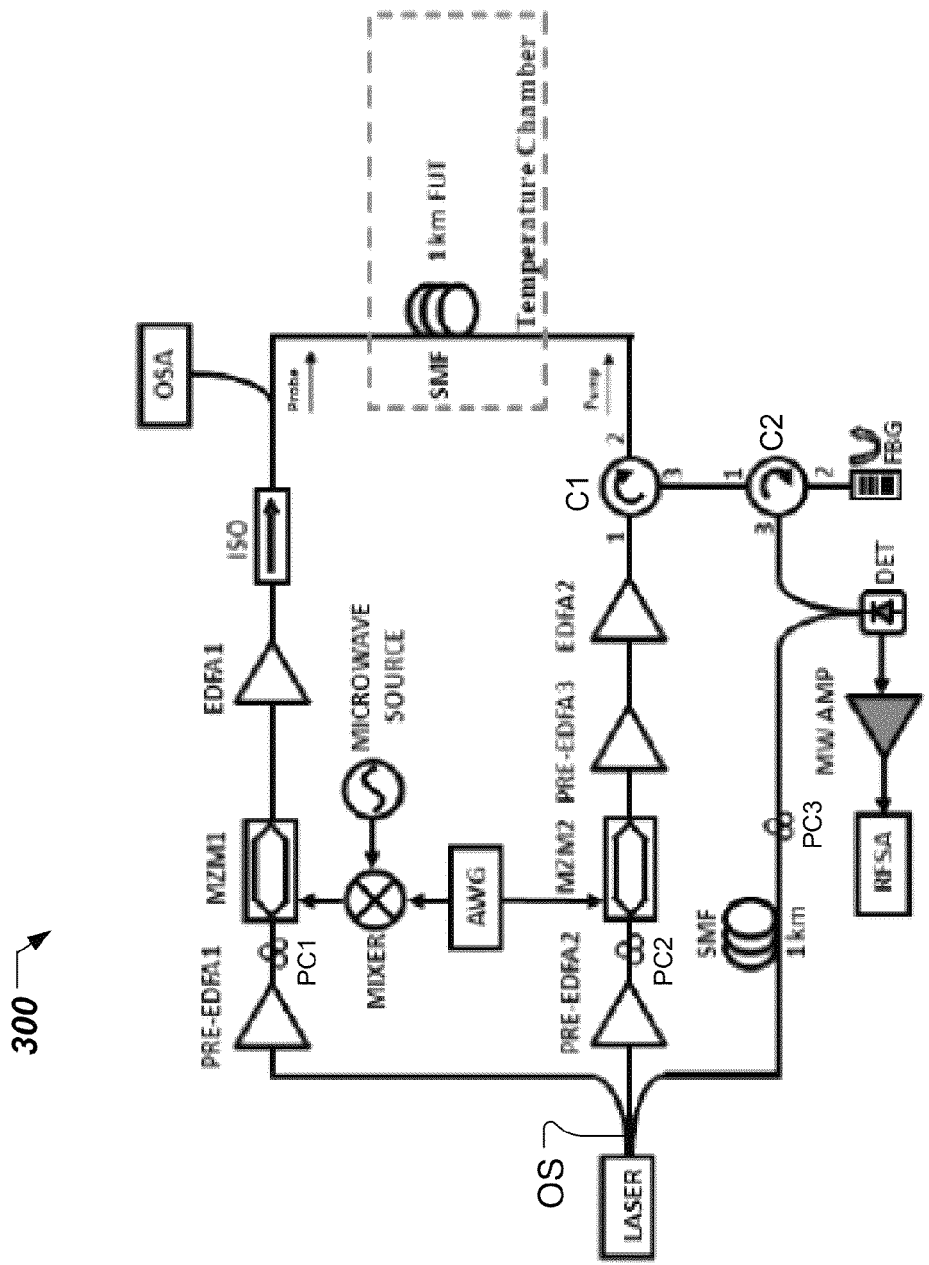
FIG. 3 shows a block diagram of an example of a continuous wave (CW) sweep-free SBS-based optical fiber sensing system.

FIG. 3 shows a block diagram of an example of a sweep-free SBS-based sensing system 300. The sensing system 300 uses continuous wave (CW) multiple pump and probe pairs, which simultaneously propagate through a fiber under test (FUT), in order to determine the BGS, BFS or both, of the fiber, in accordance with the technology 250 described above in connection with FIG. 2(b). The sensing system 300 is also referred to as a CW sweep-free SBS sensor.

A coherent tunable laser at wavelength 1547.7 nm can be split by on optical splitter (OS) into three arms to serve as a probe, a pump and a local oscillator (LO) arms. The probe arm connects the optical splitter with the first end of the FUT, and the pump arm connects the optical splitter with the second end of the FUT. The output power of the coherent tunable laser can be 5 dBM, for instance. The LO can be used as a reference signal for the coherent detection of the amplified probe signal.

The pump signal can be sent to a pre-amplification stage based on an erbium-doped fiber amplifier, Pre-EDFA2, to be amplified to the maximum allowed insertion power of a mach-zehnder modulator, MZM2, and then to a polarization controller (PC2), prior to entering the MZM2. The MZM2 is biased at its zero transmission operating point. The pump tones can be generated in a two-step process. In some implementations, a wideband arbitrary waveform generator (AWG) can be configured to emit a frequency comb, e.g., a superposition of multiple sinusoidal waves, at desired frequencies. In other implementations, the frequency comb can be obtained using high-speed modulated arbitrary modules. In some other implementations, the frequency comb can be generated using a system of crystal oscillators that are combined and frequency/phase-locked together. In yet other implementations, the frequency comb can be obtained using phase and intensity optical modulators configured to generate flat combs from a single frequency feeding source.

Then, the MZM2 is used to frequency up-convert the electronic comb to an optical one. Due to the choice of the biasing point, the number of comb frequencies is doubled in the frequency up-conversion process. The output of the MZM2 is sent to an optical pre-amplifier, Pre-EDFA3, followed by another optical amplifier, EDFA2, for further amplification. The amplified pump tones are transmitted to the FUT (in this example, a 1-km SMF-28 fiber) through an optical circulator C1. The optical fiber that is part of the system 300 can be an SMF or any other types of optical fibers. The optical isolator (ISO) prevents propagation of the pump signal through the probe arm.

The probe signal is sent to an optical pre-amplifier, Pre-EDFA1, followed by a polarization controller (PC1), so that it enters its modulator, MZM1, with the maximum allowed power and a specified polarization. An electronic RF probe comb, generated by a different channel of the AWG can be combined with an RF tone provided by a microwave source in an RF mixer prior to driving the MZM1, in the current implementation. The microwave source can be configured to provide the RF tone at a frequency approximately equal to the BFS that can be induced by the pump signal in the fiber optic, e.g., 11 GHz. Also in this implementation, the MZM1 is biased at its zero transmission point. The output of MZM1 is a double-sided optical comb, shifted by the microwave frequency (~11 GHz) from the optical carrier. The probe tones output by the MZM1 are then optically amplified, using EDFA1, before entering the FUT.

After the Brillouin amplification process is carried out in the FUT, the Brillouin amplified probe signal can be detected. A narrowband fiber Bragg grating (FBG), preceded by an optical circulator C2, can be used to filter out the upper sideband of the amplified probe comb, which does not participate in the Brillouin amplification process. In addition, removal of the upper sideband of the amplified probe comb reduces noise to the detector. The amplified probe signal is then mixed with the LO signal, after the latter has propagated through 1-km of SMF-28 fiber to ensure highly coherent heterodyning on the surface of an optical detector (DET). The LO signal can have a power of −11 dBm, and the optical detector can have a bandwidth of 12 GHz, for example. The output of the optical detector is amplified by a microwave amplifier (MW AMP) and sent to processing electronics. For example, the processing electronics can include an RF spectrum analyzer (RFSA). A computer system can communicate with the RFSA via a general purpose interface bus (GPIB).

In other implementations, the 11 GHz RF tone that determines the frequency separation between pump and probe waves can be generated by using two optically phased-locked lasers having an 11 GHz difference in their respective emission wavelengths. In some other implementations, an additional MZM modulator can be added to the probe arm of the system 300, such that the additional MZM is fed with an 11 GHz signal from the microwave source, and MZM1 is fed with RF frequency tones from the AWG. In yet some other implementations, RF frequency tones around 11 GHz can be generated by using multiple AWGs.

The sensing system 300 can be used to verify that, in the presence of multiple pump-probe pairs, appropriately separated from one another (e.g., ~100 MHz or more), each pair can experience its own Brillouin interaction, independently of the other pairs. In the experimental verification described below in connection with FIGS. 4(a)-(b), five probe tones are simultaneously swept against five pump tones. For example, five RF tones can be generated using the AWG at frequencies of 200, 350, 550, 800 and 1,100 MHz. Unequal spacings are chosen for the RF tones to ensure that their intermodulation products, originating either from the AWG or from nonlinear mixing in the fiber or both, do not coincide with any of the pump tones. The five RF tones can be used to modulate the optical pump, producing a double-sided comb around the optical carrier. For this experiment, which only requires equal spacing for the pump and probe, the probe tones were generated by mixing the same RF tones with the microwave synthesizer at frequency f (~11 GHz). The mixed signal was up-converted by MZM1 to generate probe tones shifted down from the optical carrier by f±200 MHz, f±350 MHz, f±550 MHz, f±800 MHz, f±1100 MHz (the upper side band is filtered out by the FBG).

Figure 4:
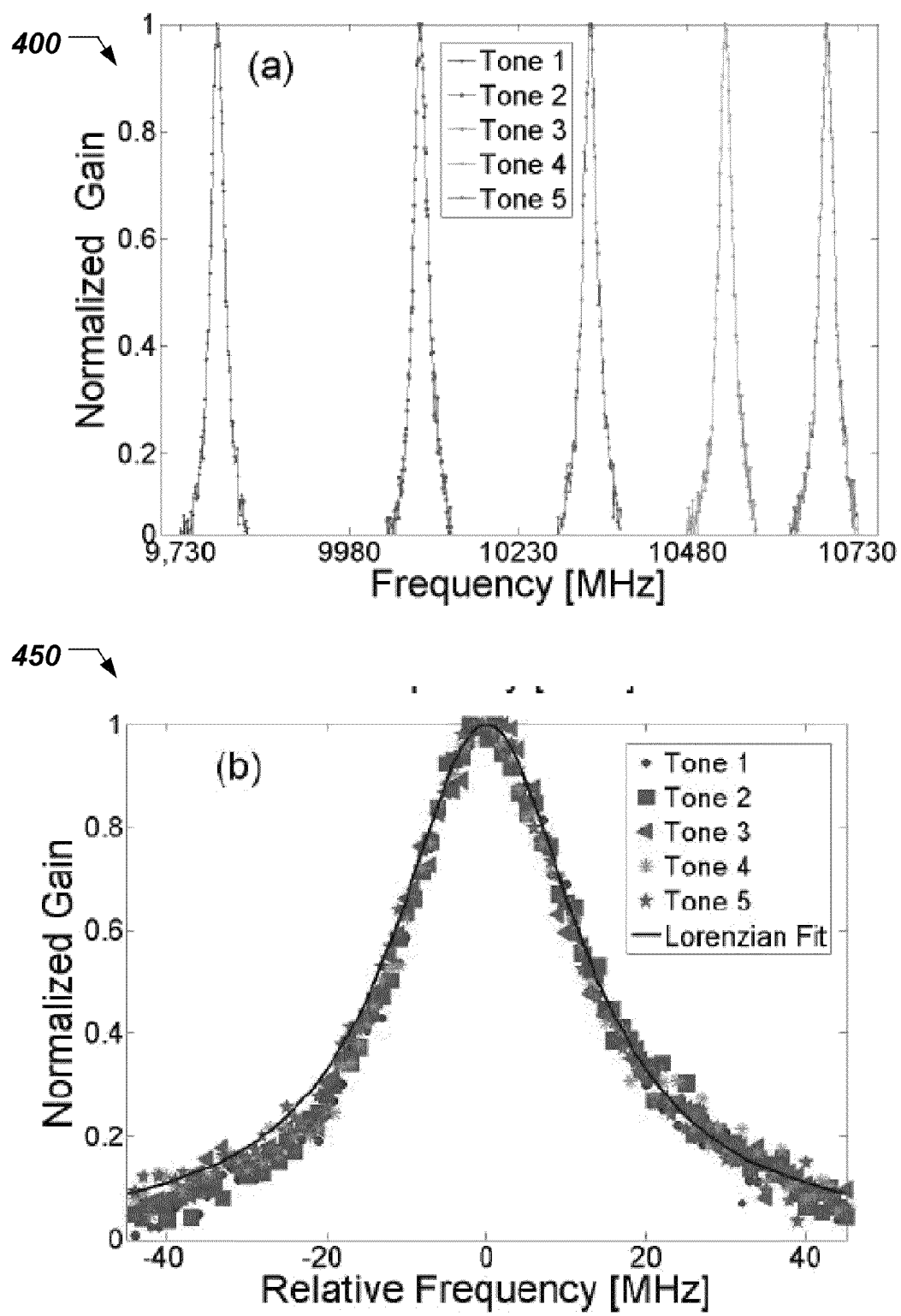
FIGS. 4-5 show aspects of a CW sweep-free SBS-based optical fiber sensing technique.

The BGSs of the five pump tones are measured by sweeping the synthesizer from f=10830 MHz to 10930 MHz with 1 MHz steps. FIG. 4(a) shows measured spectra 400 of the lower 5 BGSs. Lorentzian shape fitting was performed to each of the measured BGS, resulting in measured bandwidths of a 28.6±0.8 MHz and BFSs of 10887±1.2 MHz. FIG. 4(b) shows a superposition 450 of these 5 BGSs after proper shifting of their center frequency. These experimental values were found to be in good agreement with the results obtained from sweeping 150 a single probe against a single pump.

Figure 5:
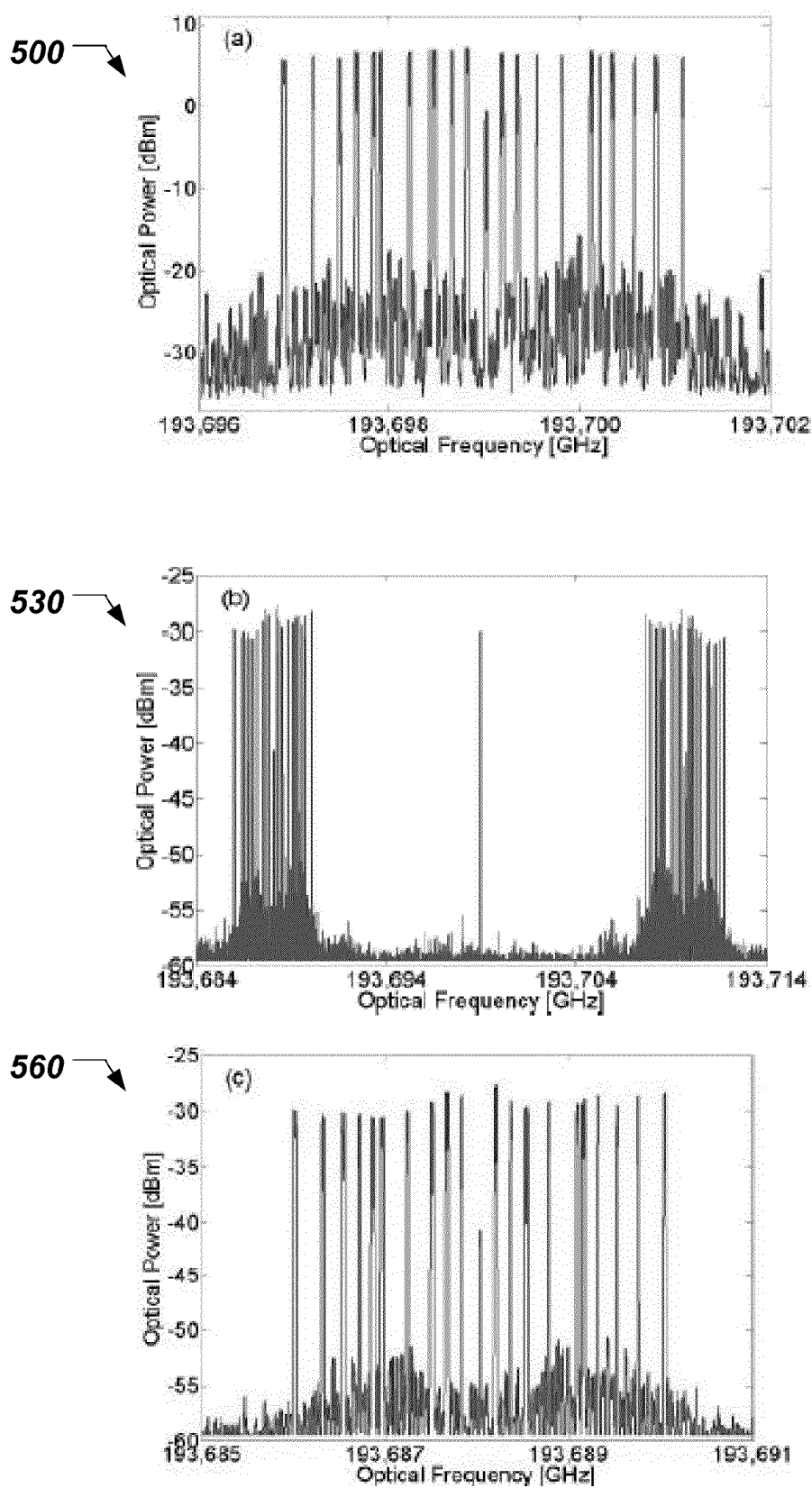

The sensing system 300 can be used to reconstruct BGS of the FUT, for example, by using twenty pump-probe pairs. Using RF tones from the AWG at 200, 350, 550, 800, 1100, 1200, 1350, 1550, 1800 and 2100 MHz, the twenty pump tone optical frequencies after frequency up-conversion are positioned ±200, ±350, ±550, ±800, ±1100, ±1200, ±1350, ±1550, ±1800 and ±2100 MHz with respect to the laser frequency. FIG. 5(a) shows power levels of the 20 pump tones 500 (~6.5 dBm), as measured by an optical spectrum analyzer with a 20 MHz spectral resolution. Some inter-modulation products can be observed with a maximum level of −17 dBm. The amplitude non-uniformity of the optical pump tones is measured to be around 1.5 dBm. This non-uniformity is used to calibrate the resultant gain of the probe tones.

The RF frequencies for the probe are: 197, 344, 541, 788, 1085, 1182, 1329, 1526, 1773 and 2070 MHz. Note that the frequency difference between corresponding pump and probe RF tones monotonically increases in 3 MHz steps. After RF mixing with a tone at 10885 MHz and frequency up-conversion using MZM1, the resulting optical probe comb frequencies were spread 8815, 9112, 9359, 9556, 9703, 9800, 10097, 10344, 10541, 10688, 11082, 11229, 11426, 11673, 11970, 12067, 12214, 12411, 12658 and 12955 MHz below the laser frequency. This arrangement corresponds to a sweep-free range of 63 MHz with a 3-MHz resolution and 6-MHz gap around the center. FIG. 5(b) shows power levels of the probe tones 530 (30 dBm) prior to being launched in the FUT, e.g., as measured with an optical spectrum analyzer (OSA) connected to the probe arm. FIG. 5(c) shows power levels of the amplified probe tones 560 (30 dBm) after FBG filtering. The optical down-shifted carrier has a power of −40 dBm. No significant inter-modulation products are observed due to the low power levels. FIG. 5(c) shows that the amplitude non-uniformity of the optical probe tones is measured to be around 2.7 dBm. Since the optical probe amplitudes can be measured with and without the pump (e.g., after exiting the FUT at the first end and prior to entering the FUT at the second end), the actual gain at each frequency tone can be estimated by dividing corresponding optical probe amplitudes measured with and without the pump. In this fashion, the stability of the amplified optical probe tones amplitude, as measured by the RFSA, can be around 0.1 dB. This probe tone stability determines the measurement error.

Figure 6:
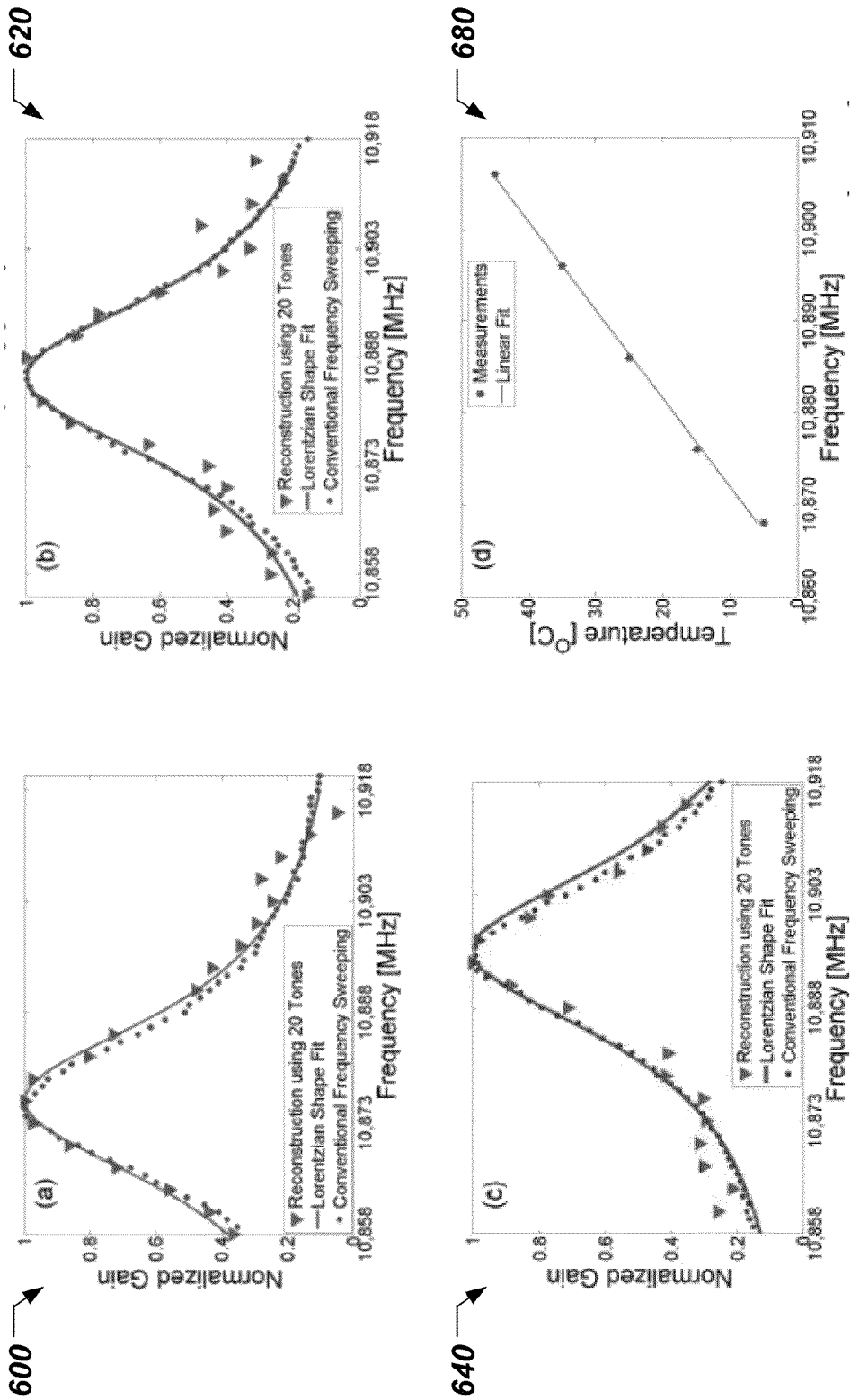
FIGS. 6(a)-(d) show results of experiments performed using a CW sweep-free SBS-based optical fiber sensing technique.

The FUT can be kept in thermal equilibrium in a temperature chamber. FIGS. 6(a)-(c) show measurements of Brillouin gain spectra as a function of the chamber temperature. The BGSs corresponding to FIGS. 6(a)-(c) were measured at 5° C. (600), 15° C. (620) and 25° C. (640), respectively. The measured BGSs (triangles) can be obtained by dividing the amplified probes by the unamplified probes (e.g., with and without pump) and calibrating for any non-uniformity of the pump tones. Lorentzian shaped fitting is performed to estimate the BGS bandwidth and its central frequency. Agreement can be found with a measurement where a single probe is swept against a single pump (dots). The mean measurement error of around 0.1 in the normalized gain is related to the stability of the probe tones. An average BGS FWHM of 28.9±0.7 MHz is measured in this experimental example. FIG. 6(d) shows that BFS changes 680 by 1±0.1° C./MHz BFS over the measured temperature range. The measurement results shown in FIG. 6(a)-(d) demonstrate the validity of the proposed sweep-free technique for the reconstruction of the BGS using CW pump and probe tones.

As described above in connection with FIG. 2(b), the spectral resolution of the sweep-free SBS sensing technique 250 is determined by the number of pairs of pump-probe tones used, and the frequency spacing between each pair determines the resolution of BGS reconstruction. FIGS. 7(a)-(d) show that the spectral resolution of the sweep-free SBS sensing technique 250 is traded against its dynamic range. Each of the FIGS. 7(a)-(d) shows that multiple pump tones, e.g., produced by the sensing system 300, generate corresponding BGSs, each BGS being ~30 MHz-wide and having a corresponding BFS. A BFS can correspond to a combination of the fiber type and strain/temperature environment. In FIGS. 7(a)-(d), the BFSs correspond to fiber temperatures of 0° C. (700), 20° C. (705), 60° C. (710) and 80° C. (715), respectively, and the 16 pump tones, are spaced by $\Delta\nu_{Pump1}$=80 MHz. In addition, simultaneous multiple probe tones (represented by the dots in FIGS. 7(a)-(d)) can be launched in the opposite direction with linearly increasing frequency spacings, for example. The probe tones can be arranged in such a way that each of them is located in a different region of the BGS induced by the corresponding pump tone. Probe tones, which are located closer to the BGS center, can see higher Brillouin gain. In this manner the $i^{th}$ tone of the probe is amplified by the $i^{th}$ tone of the pump through stimulated Brillouin scattering (SBS). In this manner the BGS can be reconstructed without the need for frequency sweeping 150.

Figure 7:
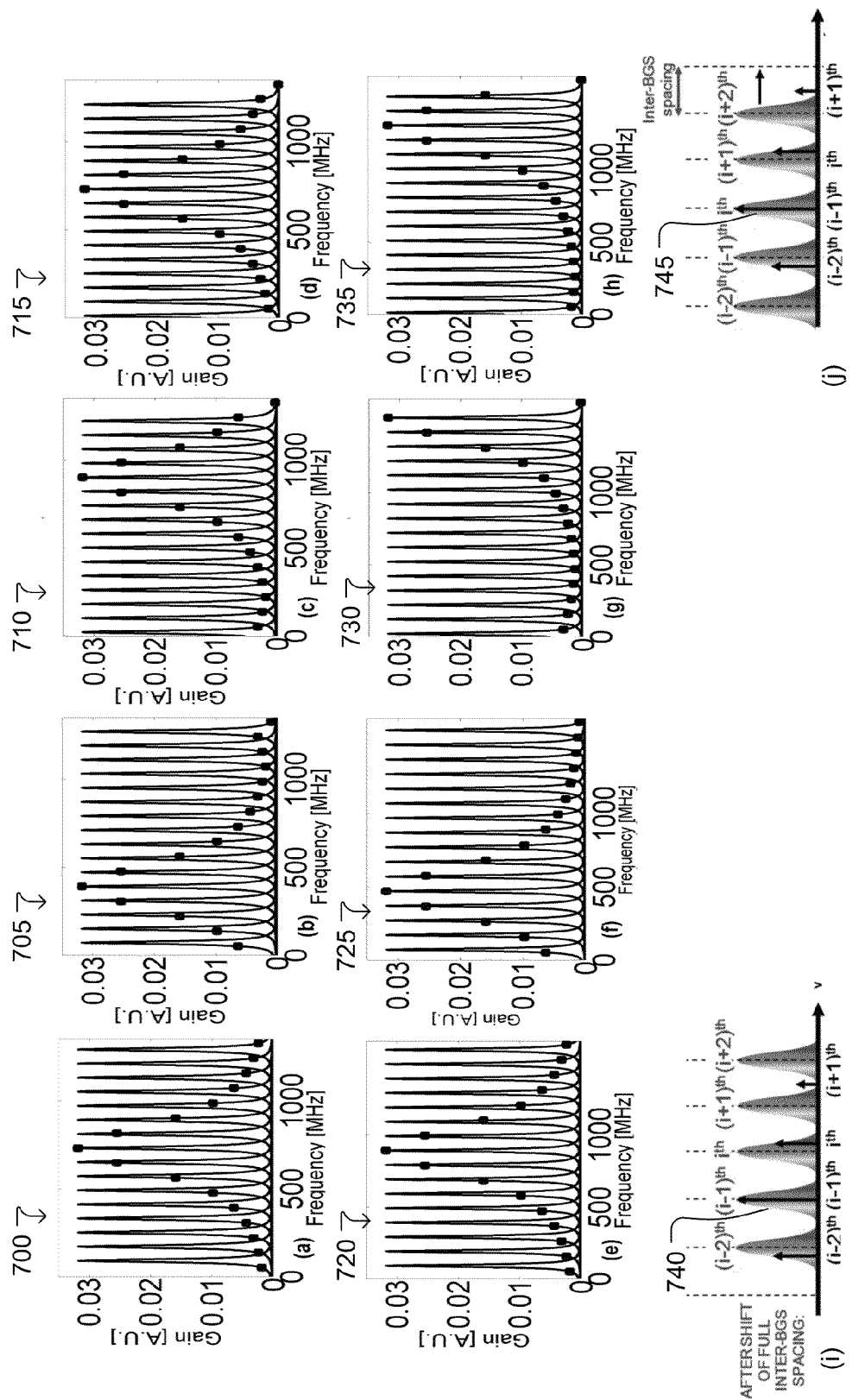
FIGS. 7(a)-(j) show aspects of a modified sweep-free SBS-based optical fiber sensing technique.

With 16 pump tones, spaced by $\Delta v_{Pump1}$=80 MHz, and an incremental increase of probe tones of 5 MHz, the dynamic range is limited to below ±40 MHz (16*5=80), because when the BGS shifts more than half of the pump spacing, the optical probe tones continue to be amplified but not by their pump counterparts. Depending on the direction of shift, the $i^{th}$ probe starts to be amplified by either the $(i-1)^{th}$ or $(i+1)^{th}$ pump tone. FIG. 7(b) shows that the first 20° C. increase correctly shifts the amplification of the fixed probe tones to the left by 20 MHz. FIG. 7(c) shows that the additional increase of 40° C. (from 20° C. to 60° C.) causes the measurement points to wrap around and appear in a wrong place. In FIGS. 7(a) and 7(d), the probe tones appear to have the same relative position with respect to the 16 BGSs despite the fact that the temperature changed by 80° C. This ambiguity is due to the fact that at 0° C., the $(i-1)^{th}$ probe tone probes the $(i-1)^{th}$ BGS 740 (as shown in FIG. 7(i)), while at 80° C., the $(i-1)^{th}$ probe tone probes the $i^{th}$ BGS 745 (as shown in FIG. 7(j).)

To extend the ±40 MHz dynamic range described above, the sensing system 300 also can be configured to perform measurements with a different pump spacing $\Delta v_{Pump2}$. FIGS. 7(a) and 7(e) show that when the $1^{st}$ probe is amplified by the $1^{st}$ pump tone, the recovered BGS center is measured at the same frequency. In contrast, when the $1^{st}$ probe tone is amplified by the $n^{th}$ pump tone, the recovered BGS center is shifted by $n(\Delta v_{Pump}-\Delta v_{Pump2})$. In this way, it can take only one additional measurement to remove the above-noted ambiguity and to determine the absolute BFS over a wider dynamic range, which can reach up to twice the least common multiple of the two frequency spacings. In FIGS. 7(e)-(h), the BFSs correspond to the same fiber temperatures of 0° C., 20° C., 60° C. and 80° C., respectively, as in FIGS. 7(a)-(d), but the 16 pump tones in FIGS. 7(e)-(h) are spaced by $\Delta v_{Pump2}$=100 MHz. When the measurement results obtained using two different frequency spacings are the same, the sweep-free SBS sensing performed using the 80 MHz spacing is considered accurate (unambiguous, unaffected by wraparound.) However, when the measurement results obtained using the two different frequency spacings are different, the results of the measurements performed using the 100 MHz spacing can be used to correctly realign (by multiples of 80 MHz) the results of the measurements performed using the 80 MHz spacing. In this manner, the sweep-free SBS sensing that uses N tones may achieve a substantial speed advantage of order $N^p$ ($1 \le p \le 2$) over sensing techniques that use sequential scanning. Based on the above description, the acceleration $N^p$ is at least N, but can be up to $N^2$, depending on the size of the dynamic range relative to the first frequency spacing $\Delta v_{Pump1}$.

In order to perform spatially-resolved sweep-free BGS measurements, the pump tones generated by the CW sweep-free SBS sensor 300 can be simultaneously or sequentially pulsed in order to excite specified portions of the fiber under test. The sweep-free SBS sensing technology 250 can be modified to operate a modified CW sweep-free sensor 300 in pulsed regime. A pulsed sweep-free SBS sensor can measure variations of the BFS distributed along the FUT. In some implementations, the modification of the CW sweep-free sensor system 300 includes pulsing multiple pump tones in the time domain. In some implementations, a detection system can include a single detector (DET). In other implementations, the detection system can include N detectors. Moreover, the processing electronics of the detection system can include, instead of the RF spectrum analyzer at the output of the detector as in the CW sweep-free SBS sensing system 300, a fast data acquisition system to digitize the amplified probe signal or multiple pre-processed instances of the same, and to generate a sensing output of the pulsed sweep-free SBS sensor. An example of a process to generate the sensing output of the pulsed sweep-free SBS sensor is described below in connection with FIG. 8.

Figure 9:
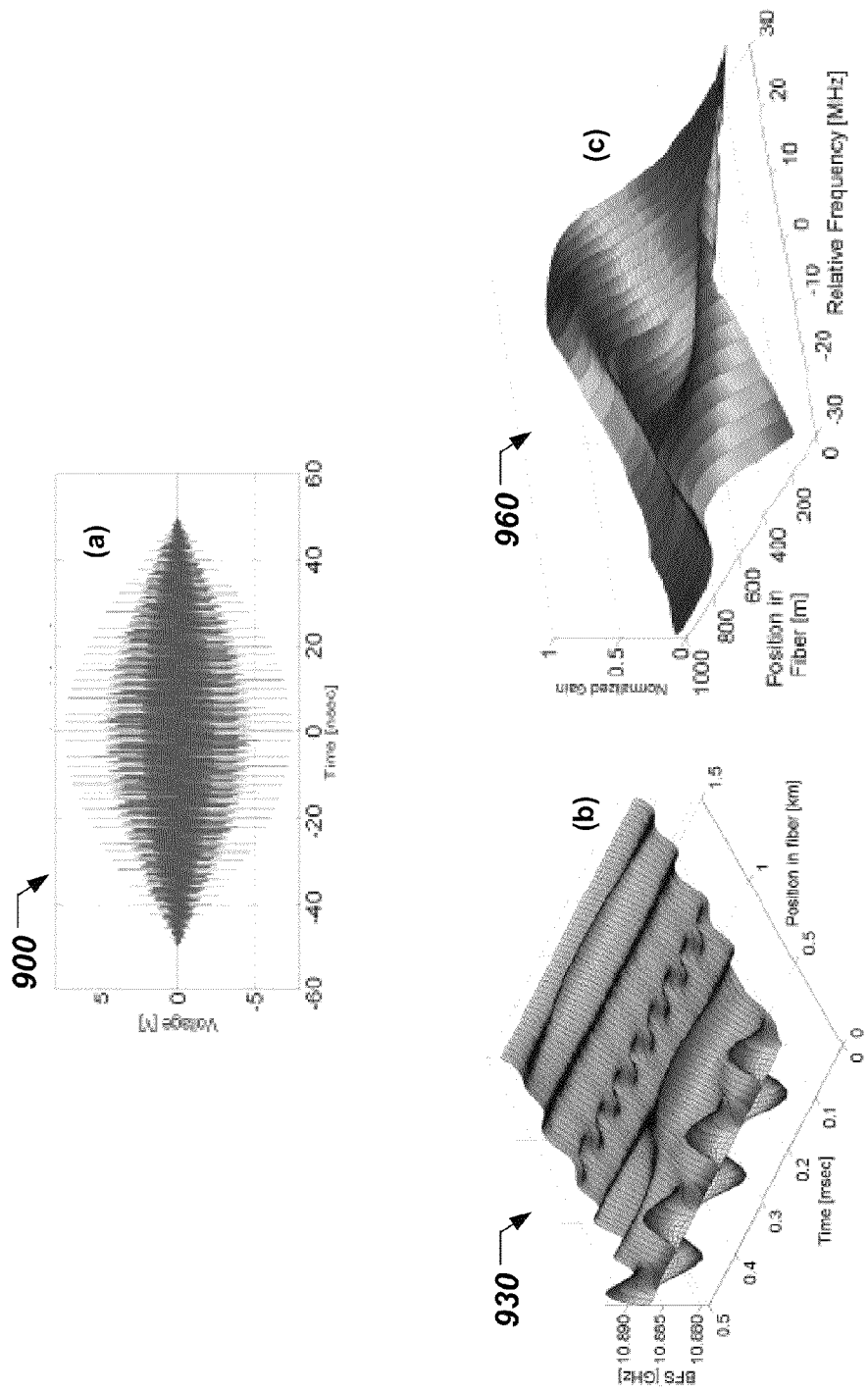
FIGS. 9(a)-(c) show aspects of a pulsed sweep-free SBS-based optical fiber sensing technique.

FIG. 9(a) shows an example of Gaussian-shaped RF pump pulse 900 that can be used by the pulsed sweep-free SBS sensor. Gaussian pulsing can be performed to reduce sidelobe noise level. In this example, the pump pulse 900 includes N=20 frequency tones and has duration of 100 nsec. This pulse width allows for approximately 100 spatial resolution cells in a 1-km fiber, or a measurement spatial resolution of 10 m. Further in this example, the repetition rate is 100 KHz. A corresponding optical probe signal can be generated to include N=20 probe tones shifted from the optical carrier frequency by a value of BFS, e.g., 10885 MHz. In this example, the Brillouin amplification in the fiber is based on a 10-m interaction length.

Figure 8:
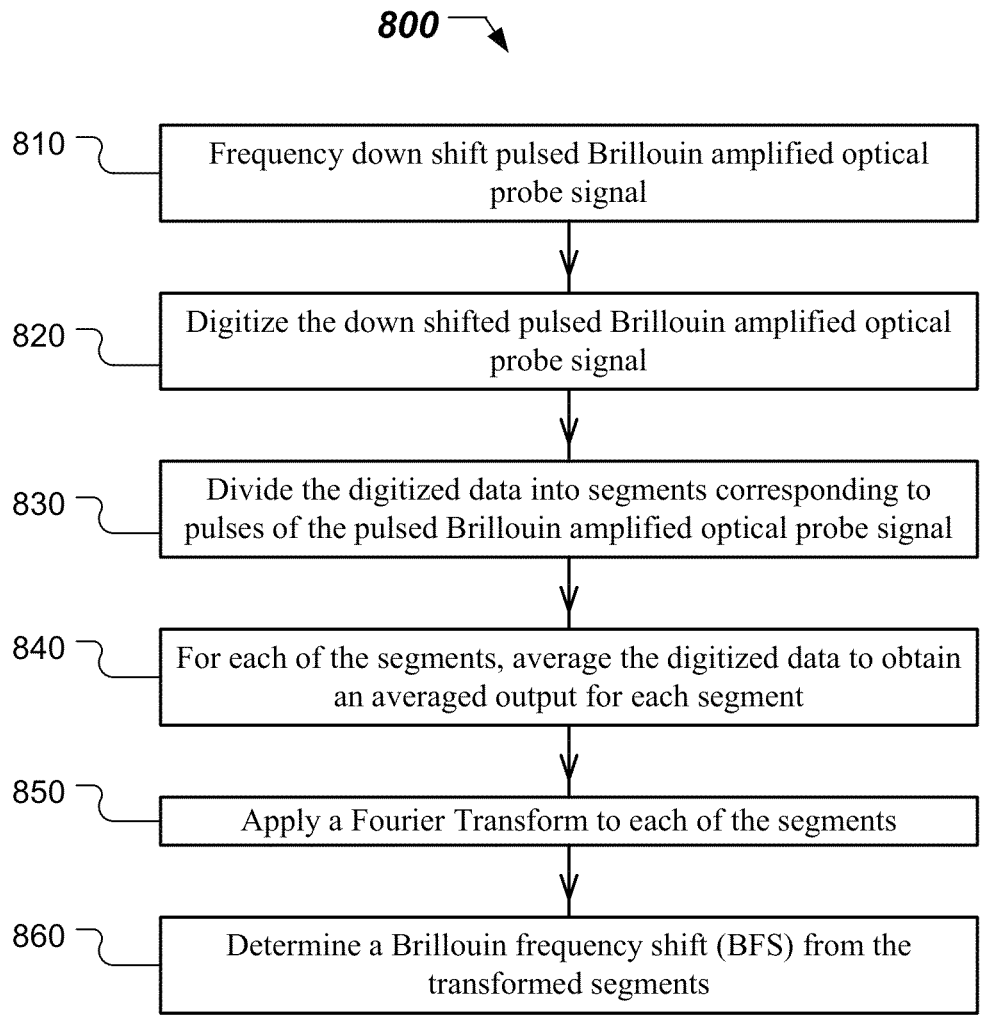
FIG. 8 shows a method used to process output of pulsed sweep-free SBS-based optical fiber sensing technique(s).

FIG. 8 shows a flowchart of a process 800 that can be implemented by the pulsed sweep-free SBS sensor to generate a sensing output corresponding to the detected pulsed optical probe signal. At 810, the Brillouin amplified optical probe signal can be down shifted to relax the digitizing speed of the detector. For example, the Brillouin amplified optical probe signal can be heterodyned down to the baseband around 3 GHz and can be band-pass filtered after detection. This band-pass filtering is performed to avoid aliasing of the probe spectrum. At 820, the down shifted Brillouin amplified optical probe signal can be digitized by the detector. In some implementations, 810-820 can be performed in the following manner: N optical detectors can be used to frequency down shift N instances of the amplified optical probe signal. A heterodyning process can be performed at each of the N detectors using different optical local oscillators. Outputs of the detectors can be low-pass (LP) filtered and then digitized (e.g., with low-frequency sampling scope(s)). In other implementations, 810-820 can be performed in the following manner: the output of a single optical detector can be split into N instances of the output, which are then filtered by N RF filters. The N RF filtered output instances can be digitized (e.g., with low-frequency sampling scope(s)) and associated with respective intensities of the probe tones. In some other implementations, 810-820 can be performed in the following manner: a single optical detector can be used in combination with N digital filters instead of the N RF filters described above.

After any of above implementations of 810-820, at 830, the digitized data can be divided into segments corresponding to the detected Brillouin amplified optical probe pulses. For example, the digitized data can be arranged in a two-dimensional matrix with each row representing samples along the fiber generated by a single pulse of pump tones, and consecutive rows represent the action of consecutive pump pulses, generated at a rate of $R_p$ pulses per second. For a pulse width of T seconds, e.g., $10^{-8}$ s, each row is then divided into segments of length T. At 840, for each segment of the multiple segments, the digitized data corresponding to the segment can be averaged to obtain an averaged output corresponding to the segment.

At 850, the averaged data of each segment can be Fourier transformed to obtain the intensities of the various probe tones. 850 may be eliminated for some of the above alternative implementations of 810-820. At 860, the obtained intensities can be used to reconstruct the BGS and determine the BFS. In some implementations, the transformed data is normalized prior to the BGS reconstruction. For example, the Brillouin amplified optical probe signal can be normalized by dividing by the unamplified probes (i.e., with no pump). The aspects 840-860 of the process 800 can be repeated for all other segments of interest, and then sequentially applied to corresponding segments in successive rows of the matrix.

For example, the process 800 can be used to generate a map of the BFS in the distance-time domain. On this map the spatial resolution is on the order of $V_g T$ ($V_g$ is the group velocity of light in the fiber), while the time resolution is inversely proportional to the product of $R_p$ and the number of required averages. With finite processing speed, the multi-tone interrogation technique described in this specification is faster than the frequency sweeping technique 150 by a factor equal to the quantity N of pump-probe pairs used for BGS reconstruction, since each pair replaces one sweeping step in the frequency sweeping technique 150. In order to understand the limitations brought about by the finite available processing speed, the following analysis is performed. For instance, the tone spacing can be on the order of 100 MHz, the sampling speed can be 4GSamples/sec and the pulse width $\tau_p$ can be 100 nsec, resulting in a 400-samples-long record per segment. Application Specific Integrated Circuit(s) can be configured to FFT ~500,000 such records per sec. This processing rate is denoted $v_{FFT}$. Since a 100 nsec long segment is 10 m long, the number of processed segments can be traded with the speed in which the varying phenomenon is sampled. Given fiber of length $L_F$, the total processing time is $2L_F/(c\tau_p v_{FFT})$. It may be shown that for 1.5-km fiber the total latency time is around 300 µsec assuming that no averaging is performed. FIG. 9(b) shows BFS results represented in distance-time format. The results shown in FIG. 9(b) illustrate that acoustical disturbances 930 with different frequencies give rise to a change in BFS over time and over the 1.5-km-length of the fiber.

As another example, the process 800 can be used to generate a spectrogram arranged in a two-dimensional matrix with each row representing samples along the length of the FUT generated by a single pump pulse, and consecutive rows represent the action of consecutive pump pulses. FIG. 9(c) shows a spectrogram 960 that illustrates sinusoidal variations of the temperature giving rise to 20 MHz shifting of the BGS as a function of both the location in the fiber and relative frequency.

The use of many simultaneous pump tones, in the CW and pulsed implementations of the sweep-free SBS sensor described above, may strain the Erbium-doped fiber amplifiers (EDFAs) of the sweep-free SBS sensor. Furthermore, pump inter-tone modulation effects caused by the simultaneous propagation through the fiber of the pump tones may also become detrimental to the accuracy of the sweep-free SBS sensor. To address these issues, sequentially launched pump tones can be used to measure BGS and BFS in a sweep-free fashion, where the single pump pulse of width T, including the N frequency tones, of the pulsed sweep-free SBS sensor is replaced by a sequence of N equally-wide sub-pulses, each of the sub-pulses having a different frequency.

Figure 10:
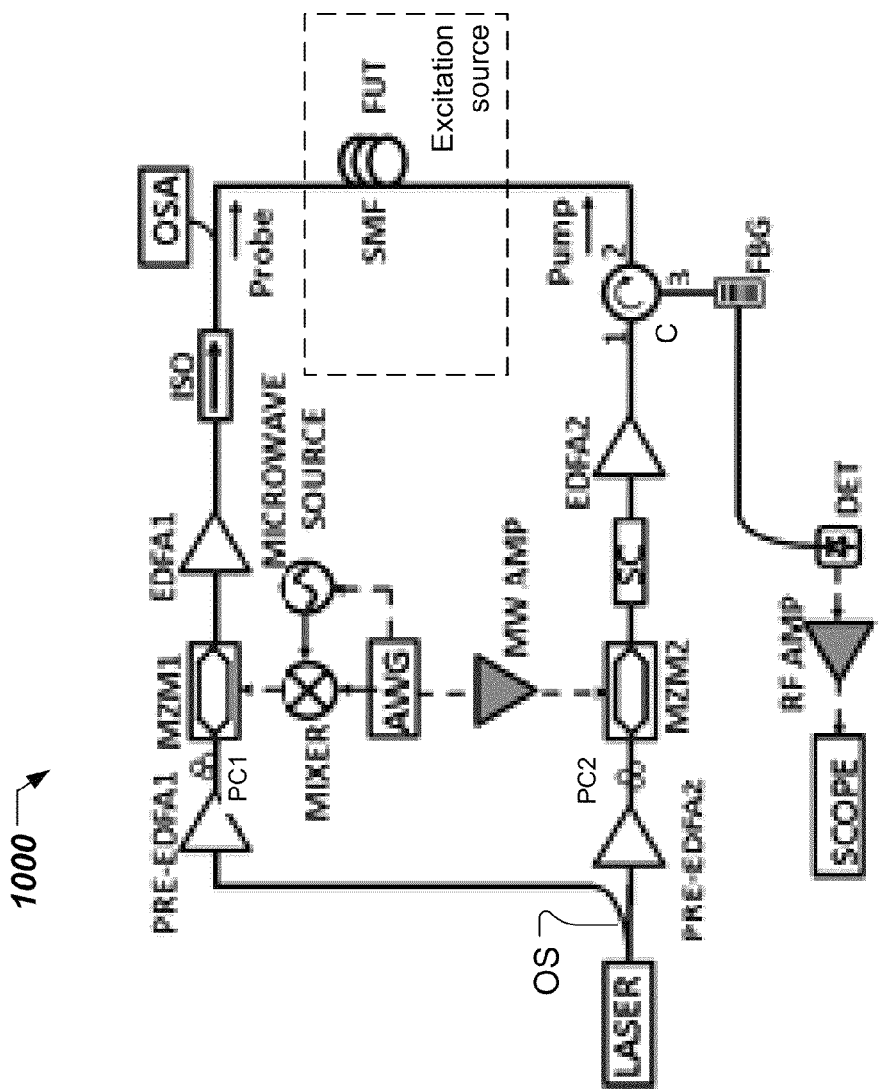
FIG. 10 shows a block diagram of an example of a time domain sweep-free SBS-based optical fiber sensing system.

FIG. 10 shows a block diagram of an example of a time domain sweep-free SBS sensing system 1000, also referred to as a time domain sweep-free SBS sensor, that uses multiple pump and probe pairs that sequentially propagate through a fiber under test (FUT) in order to determine the time dependence of BGS, BFS or both of the fiber. An output of a tunable laser (having a linewidth of 80 kHz, for instance) can be split by an optical splitter (OS) into probe and pump arms. The probe arm connects the optical splitter with the first end of the FUT, and the pump arm connects the optical splitter with the second end of the FUT.

An RF frequency comb is generated by a wideband arbitrary waveform generator (AWG) to form the probe wave. This RF signal is a superposition of multiple (N) sinusoidal waves (tones) at the desired frequencies. Then, an intermediate-frequency (IF) input of an RF mixer is fed with the N-tones from the AWG signal, while its LO input is driven by a synthesizer, resulting in 2N RF tones, symmetrically arranged around LO frequency. For example, the synthesizer can be a microwave source running at 10870 MHz. This compound signal drives a Mach-Zehnder modulator, MZM1, operating at its quadrature point. The MZM1 translates this microwave signal to the optical domain, generating two optical multiple-tone sidebands (2N-tone each) around the laser frequency, such that the lower sideband is to serve as the probe. Power levels of the optical multiple-tone sidebands can be measured prior to being launched in the FUT by using, e.g., an optical spectrum analyzer (OSA) connected to the probe arm. Note that in this implementation of the time domain sweep-free SBS sensor 1000 the laser frequency is also present in the probe wave. In contrast, the MZM1 of the CW sweep-free SBS sensing system 300 is biased near zero transmission, allowing only for a much weaker laser frequency component to propagate through the FUT. Although the laser frequency has no pump counterpart for Brillouin amplification, the former can be used in time domain sweep-free SBS sensor 1000 for heterodyne detection of the amplified probe tones, because the pump pulsed wave is also derived from the same laser frequency.

Figure 11:
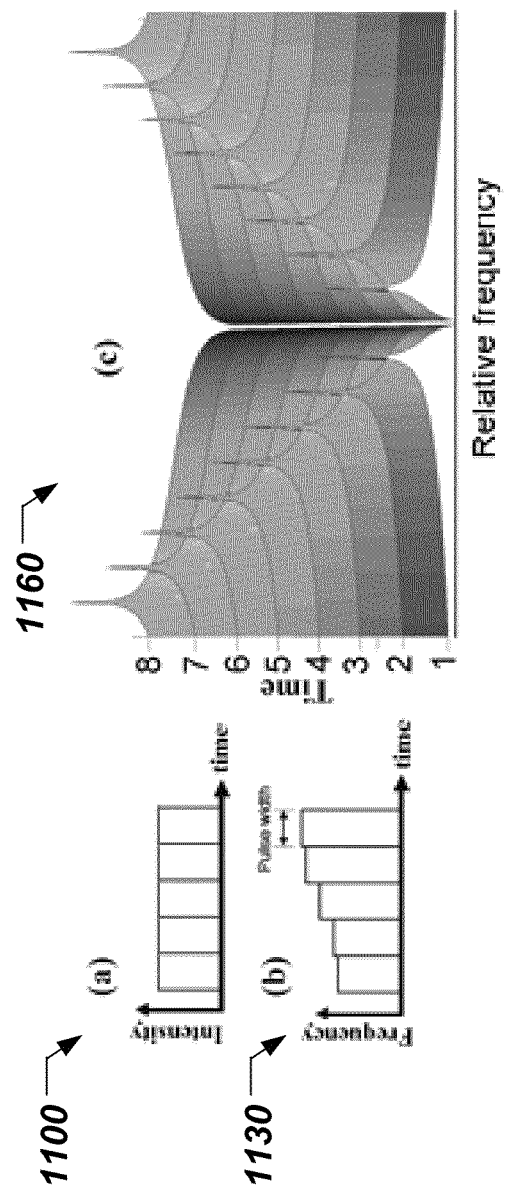
FIGS. 11(a)-(c) show aspects of a sequentially pulsed sweep-free SBS-based optical fiber sensing technique.

The sequential pump tone launching is performed by the time domain sweep-free SBS sensor 1000 in the following manner. For N pump tones, the pump wave includes a sequence of T-wide, N sub-pulses, each sub-pulse riding on a different frequency tone from among the N frequency tones. Another channel of the AWG generates a signal including a sequence of equally-wide sub-pulses, each with a different frequency. FIG. 11(a) shows intensity 1100 of the sub-pulses versus time. FIG. 11(b) shows frequency 1130 of the sub-pulses versus time. For example, the equally-wide sub-pulses can have a pulse width of 50 ns. As another example, the equally-wide sub-pulses can have a pulse width of 500 ns. Modulator (MZM2), operating at its zero-transmission point, is used to translate the RF pump pulse train to the optical domain. Each sub-pulse generates two optical pulsed tones. FIG. 11(c) shows a spectrogram 1160 of the compound optical pulse used for sequential pumping. The laser frequency is located at the center of the horizontal optical frequency axis. For example, the RF sub-pulse, riding on an RF carrier of 105 MHz will generate a pair of time-overlapping pulses, one riding on an optical carrier having a frequency 105 MHz higher than that of the laser frequency, while the other is 105 MHz below the laser frequency.

Using this technique, the overall required instantaneous optical power used for, amplification is just 3 dB higher than in sweep-based sensing, since at each time slot only two optical tones (generated from a single RF tone) are generated by MZM2. Furthermore, since pulsing of the pump tones is performed in the RF domain, and since MZM2 is a high extinction ratio modulator, biased at its zero transmission point, very high extinction ratio can be achieved for the pump pulses. When the FUT length far exceeds the pump pulse length, no measurement speed is lost by using the described sequential pumping, thereby increasing the few nanosecond-wide sub-pulse only by a factor of N. The sequential launching of the pump tones results in time-shifted amplified probe tones, to be realigned at the post processing stage by a temporal correction, as described below in connection with FIG. 12(a).

Returning now to the pump channel, an Erbium-doped fiber amplifier (PRE-EDFA2) preceding MZM2, serves to reach the maximum allowed input power into MZM2. From MZM2 the pump signal continues to EDFA2 for further optical amplification, and finally to the fiber under test (FUT) via a circulator C. A polarization-scrambling device (SC) is located prior to EDFA2, to average out the influence of the polarization dependence of the Brillouin gain. The optical isolator (ISO) prevents propagation of the pump signal through the probe arm.

After the Brillouin spectrally-selective amplification, the 2N tones in the probe signal travel to a wideband photodetector. A fiber Bragg grating (FBG) is used to block the upper optical sideband of the probe wave. The 2N tones in the probe signal hit the photo-detector and mix with the laser frequency that has co-propagated with them through the FUT. At the output of the wideband photo-detector 2N-RF tones are obtained, whose frequencies lie around 10870 MHz, for example. This signal is then amplified by an RF amplifier and sent to processing electronics for sampling and post-processing. For example, the processing electronics can include a fast (e.g., 20 GHz bandwidth) real-time acquisition system.

Figure 12:
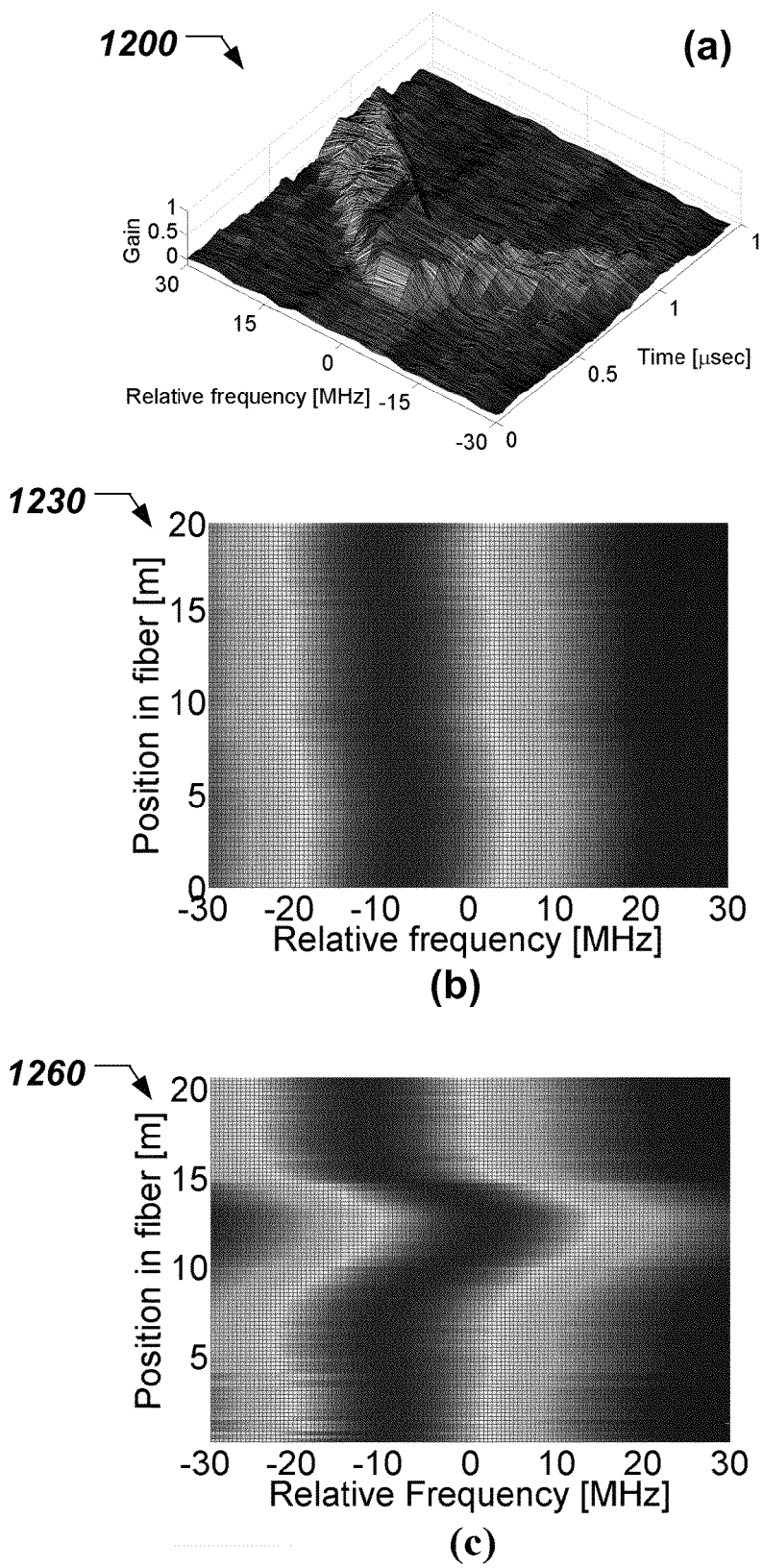
FIGS. 12-15 show results of experiments performed using a time domain sweep-free SBS-based optical fiber sensing technique.

FIGS. 12(a)-(c) show experimental results obtained using the time domain sweep-free SBS sensing system 1000 to determine BGS of a fiber subjected to strain. In this experiment, pump sub-pulses of 50 ns are used. Ten 50 ns pump sub-pulses corresponding to N=10 pump (probe) tones are used: 105 (102), 240 (234), 390 (381), 525 (513), 670 (655), 810 (792), 955 (934), 1090 (1066), 1230 (1203) and 1370 (1340) MHz. After up-conversion, the resulting optical probe comb included 20 different frequencies located around 10877 MHz, corresponding, respectively, to a sweep-free range of 60 MHz, with a 3-MHz frequency resolution.

For each launched compound pump pulse, the Brillouin probe signal returned from the fiber is collected from the beginning of the first pump sub-pulse until the contribution of the last pump sub-pulse returned from the fiber end. In some implementations, probe signal can be collected beyond the Brillouin probe signal from the last sub-pulse, thereby recording the unamplified probe signal, to be used for the estimation of the Brillouin gain of the individual probe tones. The recorded signal can be averaged over a quantity, e.g., 22, of launched compound pump pulses. For a sub-pulse of duration T, the recorded signal is divided into T-long sections, each representing a fiber segment of length $V_g T/2$, where $V_g$ is the group velocity of the optical signals in the fiber. Each T-long section is Fourier transformed to obtain a spectrogram showing the time evolution of each of the 20 optical tones.

FIG. 12(a) shows the obtained spectrogram 1200, for an essentially Brillouin-homogeneous, 20 m-long fiber. The pump pulses have a pulse width T=50 ns, and each has a frequency tone from among 20 (N=10) tones centered around the fiber BFS. The first two sub-pulses are detected first at the detector. These first sub-pulses carry frequencies closest to the fiber BFS, thereby measuring the gain near the peak of the BGS. The last to arrive sub-pulses have frequencies farthest from the BFS and provide information on the gain in the wings of the BGS. The obtained spectrogram can be time-shifted and Lorentzian fitted (with peak normalization after fitting) to generate a distance-frequency distribution corresponding to the uniform fiber. FIG. 12(b) shows the generated distance-frequency distribution 1230 of the 20 m-long, stress free FUT.

Also as part of the current experiment, the middle 4 m part of the 20 m fiber is stretched. FIG. 12(c) shows another distance-frequency distribution 1260 corresponding to the stretched FUT. The distance-frequency distribution 1260 illustrates that stretching gives rise to a 14 MHz shift in the BFS compared to the BFS of the un-stretched fiber. The value of the BFS shift indicates a local average strain of ~280µɛ. In this example, 22 integrations are performed resulting in a total sensing time of ~30 µsec, as the pump pulses have a repetition rate of 1 MHz. Reconstruction of the BGS in this experiment can have a spatial resolution of 5 m.

Figure 13:
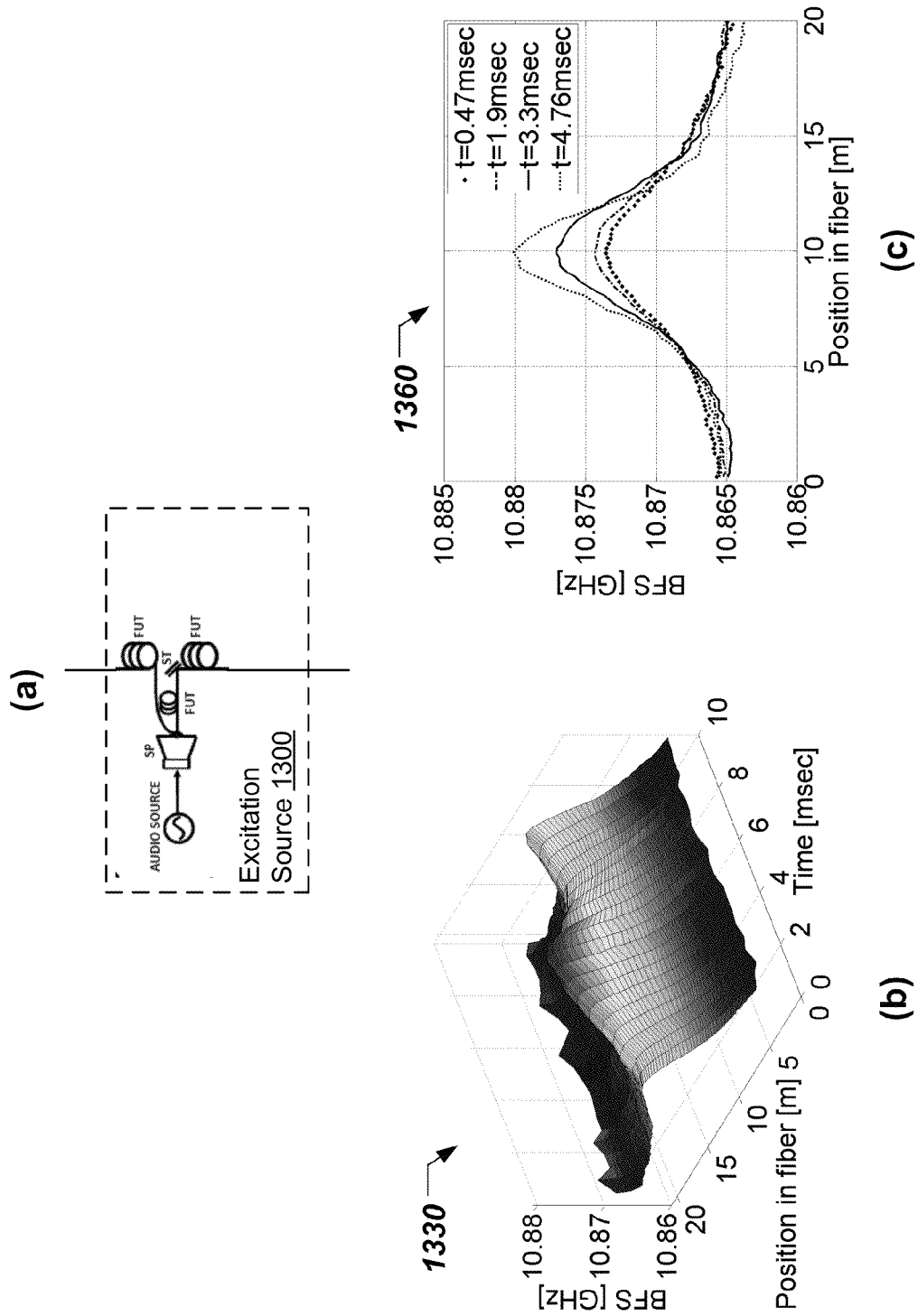

FIGS. 13(a)-(c) show experimental results obtained using the time domain sweep-free SBS sensing system 1000 to determine BFS of a fiber subjected to acoustic excitations. FIG. 13(a) shows a FUT including a ~30 m of SMF-28 fiber being exposed to acoustic excitations from excitation source 1300. The middle 4 m section of this fiber is stretched between the center of the membrane of an audio speaker (SP) and a fixed stage (ST). This fiber section can be subjected to a periodic tension by applying a sinusoidal voltage to the speaker through an audio amplifier.

In this experiment, ten (N=10) RF tones can be used for the optical comb generation. The chosen RF pump tone frequencies are 105, 240, 390, 525, 670, 810, 955, 1090, 1230 and 1370 MHz. This unequal spacing is used to reduce the detrimental effect of inter-modulation products. The relatively large spacing between adjacent tones was selected to minimize crosstalk originating from possible broadening of the Brillouin linewidth under narrow (50 ns for each sub-pulse) pump pulse interrogation. The chosen RF probe tone frequencies are 102, 234, 381, 513, 655, 792, 934, 1066, 1203 and 1340 MHz, respectively, having a 3-MHz spacing decrement relative to the pump tone spacing. After frequency up-conversion, the resulting optical probe comb includes 20 different frequencies located around 10870 MHz. This arrangement corresponds to a sweep-free range of 60 MHz with a 3-MHz frequency resolution.

The sequential train of pump sub-pulses, having an overall length of 500 ns (=50 ns·10) is launched at a rate of 200kTrains per second. The time domain sweep-free SBS sensor 1000 allows for the Brillouin-amplified probes from the fiber to be collected from the beginning of the first pump sub-pulse until the contribution of the last pump sub-pulse returned from the fiber end. In this case, the data is collected for 5 µSec per pump train and then continuously recorded until the data from all other pump trains are acquired to produce a total record length of 10 mSec. Down sampling techniques can be employed to sample the ~11 GHz signal at 6.25GSamples/s. Such sub-Nyquist sampling creates a replica of the probe baseband signal around 1.5 GHz (=|11−2*6.25|). Since the bandwidth of the signal is ~2.7 GHz (2*1370 MHz), a 3 GHz RF filter can recover the signal in full and with no aliasing. The measurement of the probe signal can be performed twice: with and without the pump. The total record length of 10 mSec, including 62.5MSamples, is divided into 21 segments, where each 475 µsec segment includes 95 consecutive probe traces. For each segment, the probe data are then averaged 95 times and Fourier transformed to obtain the heights of the various probe tones, from which, after proper normalization, the BGS is reconstructed and the BFS is determined. This averaging of the original 200kSamples/sec has resulted in a reduction of the effective sampling rate to 2kSamples/sec, but without penalty to the spatial resolution of about 5 m, as determined by the 50 ns sub-pulse width.

For the example illustrated in FIG. 13(a), a sinusoidal signal with a frequency of 140 Hz can be applied to the input of the audio amplifier, and the BGS of the fiber was reconstructed in a distributed manner. FIG. 13(b) shows a surface 1330 of the BFS, as a function of both distance and time, due to about a cycle of the induced strain vibration. FIG. 13(c) shows constant-time cuts 1360 through the BFS surface 1330 from FIG. 13(b). The constant-time cuts 1360 describe the BFS variation along the fiber at selected time instances. The results depicted in FIGS. 13(b)-(c) show that the time domain sweep-free SBS sensor 1000 can be used to measure strain fluctuations at a frequency of 140 Hz with a spatial resolution of 5 m.

Figure 14:
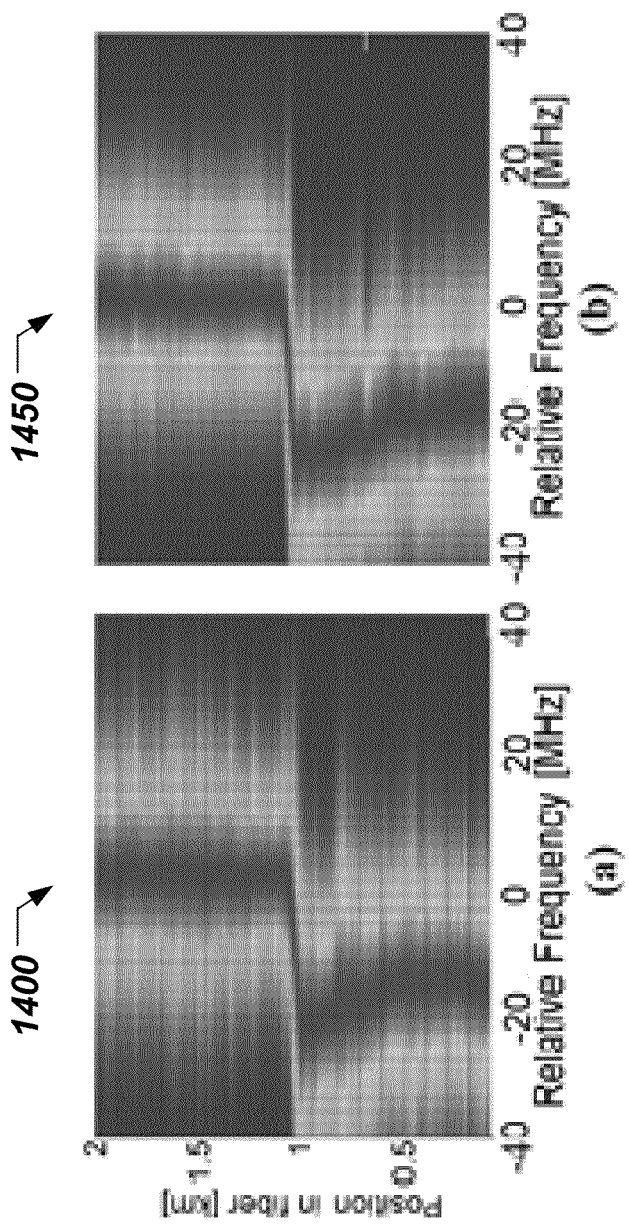

FIGS. 14(a)-(b) show experimental results obtained using the time domain sweep-free SBS sensing system 1000 to determine spatially resolved BGS of a FUT including two optical fibers sliced together. The FUT has a total length of 2 km and includes two 1 km fiber segments with different BFSs of 10877 and 10892 MHz, spliced together at the position 1000 m. In this experiment, pump sub-pulses of 500 ns are used. Fifteen 500 ns pump sub-pulses corresponding to N=15 pump (probe) tones are used: 80, 155, 275, 375, 450, 535, 625, 725, 810, 900, 985, 1080, 1160, 1250 and 1350 MHz. This unequal spacing was used to reduce the detrimental effect of inter-modulation products. The corresponding RF probe tone frequencies were 77, 149, 266, 363, 435, 517, 604, 701, 783, 870, 952, 1044, 1121, 1208 and 1305 MHz, having a 3-MHz spacing decrement relative to the pump tone spacing. After up-conversion, the resulting optical probe comb included 30 different frequencies located around 10877 MHz, corresponding, respectively, to a sweep-free range of 90 MHz, with a 3-MHz frequency resolution.

In this experiment, in order to minimize temperature effects on the BFS, the FUT was kept in a 35° C. inside a temperature chamber. FIG. 14(a) shows a surface 1400 of the BGS, as a function of both distance and time, which illustrates the resultant BGS variation near the joint of the two segments of the FUT measured using the time domain sweep-free SBS sensing system 1000. In this example, Lorentzian fit is performed, giving an average BGS FWHM of 29.1±2 MHz. Sweep-free measurements performed using the time domain sweep-free SBS sensing system 1000 compared favorably with results obtained by using the frequency sweeping technique 150. For example, FIG. 14(b) shows another surface 1450 of the BGS, as a function of both distance and time, which illustrates a BGS FWHM of 27.6±1.5 MHz, measured using the frequency sweeping technique 150 with the a frequency sweep step of 3 MHz and pulse width of 500 ns. The change in BFS near the end of the first fiber is not due to the effective spatial resolution of 50 m, but rather to strain variations resulting from manual spooling.

FIGS. 15(a)-(g) show experimental results obtained using an extension of the dynamic range of the time domain sweep-free SBS sensing system 1000 to determine spatially resolved BGS at various temperatures for a FUT including two optical fibers sliced together. The FUT includes 1-km and 2-km SMF-28 fiber spools with different BFSs. The first spool is located inside a temperature chamber. This fiber section is subjected to a change of temperature.

In this experiment, the IF input of the RF mixer is fed with the N-tones from the AWG signal, while its LO input is driven by a synthesizer running at 10870 MHz, resulting in 2N RF tones, symmetrically arranged around 10870 MHz. A quantity N=8 RF tones are used for the optical comb generation. The chosen RF pump tone frequencies are from 40 MHz to 600 MHz with $\Delta v_{Pump1}$=80 MHz spacing. The frequency increment of the probe tone spacing obeys $2N\delta v_{Probe}$=80 MHz, where $\delta v_{Probe}$ is also the BGS recovery resolution. The chosen RF probe tone frequencies are from 35 to 540 MHz, with $\delta v_{Probe}$=5 MHz. After up-conversion, each of the optical probe and pump combs include 16 different frequencies. This arrangement corresponds to a sweep-free range of 80 MHz with a 5 MHz resolution, as described above in connection with FIGS. 7(a)-(d).

Figure 15:
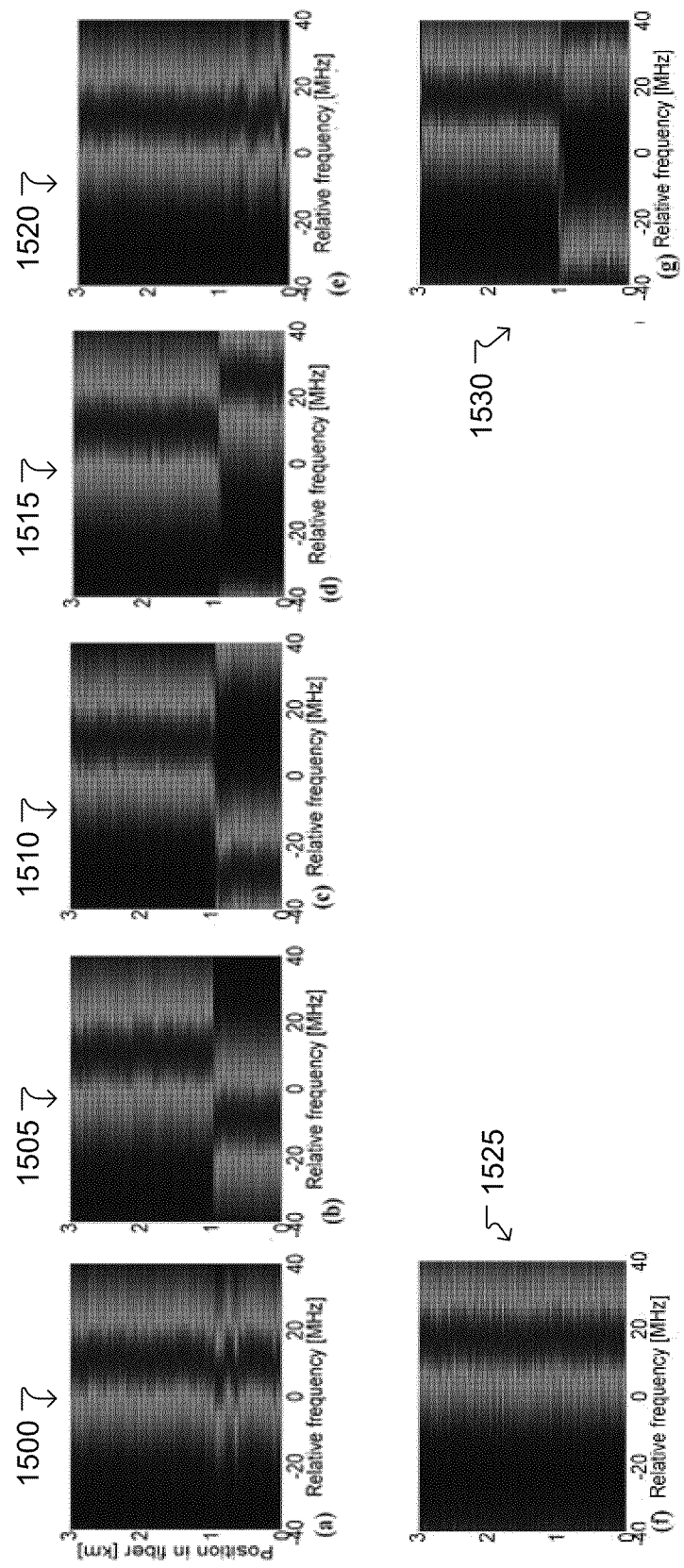

In this experiment, the measurement of the amplification of the probe tones was performed twice: with and without the pump. The temperature of the first fiber was gradually increased in 20° C. steps: 0° C. (1500), 20° C. (1505), 40° C. (1510), 60° C. (1515), and 80° C. (1520). FIGS. 15(a)-(e) show spatially-resolved BGSs measured under these temperatures. Once the BGS shifts by more than half the pump spacing (>40 MHz), it appears from the other side (see, e.g., FIG. 7(c)), until there is no way to differentiate between the 0° C. and 80° C. cases, (see, e.g., FIG. 7(d)). FIGS. 15(f) and 15(g) show spatially-resolved BGSs measured at 0° C. (1525) and 80° C. (1530), respectively, using larger pump tone spacing $\Delta v_{Pump2}$=100 MHz. The measurement results shown in FIGS. 15(a) and 15(f) are the same, hence, indicating correct assessment of the BFS at 0° C., using pump tone spacing $\Delta v_{Pump1}$=80 MHz. However, the results of the measurements taken at 80° C. and shown in FIGS. 15(e) and 15(g) are different. To remove the ambiguity of the results (measured using the pump tone spacing $\Delta v_{Pump1}$=80 MHz) shown in FIG. 15(e), the spatially-resolved BGS from FIG. 15(e) can be realigned by subtracting 80 MHz. After realignment, the spatially-resolved BGS (measured using $\Delta v_{Pump1}$=80 MHz) of FIG. 15(e) would have similar appearance with the spatially-resolved BGS (measured using $\Delta v_{Pump2}$=100 MHz) of FIG. 15(g). In the present experiment, the sweep-free dynamic range with no ambiguity can reach 800 MHz (2*400 MHz).

In general, any of the analysis methods described above, including distributed BGS and BFS, can be implemented in computer hardware or software, or a combination of both. For example, in some embodiments, the processing electronics can be installed in a computer that is connected to or is part of the detection system and is configured to perform analysis of the amplified probe signals. Analysis can be implemented in computer programs using known programming techniques following the methods described herein. Program code is applied to input data (e.g., RF comb information) to perform the functions described herein and generate output information (e.g., distributed BGS or BFS information). The output information is applied to one or more output devices such as a display device. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis methods can also be implemented as a computer-readable storage medium, configured with a computer program, where the storage medium so configured causes a computer to operate in a specific and predefined manner to perform the functions described herein.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of sensing using an optical fiber, the method comprising:
   interrogating different parts of a Brillouin gain spectrum using multiple optical tones in the optical fiber, said interrogating comprising
      sending at least two pump tones into the optical fiber from one end of the optical fiber, where a frequency spacing between the pump tones is larger than a width of the Brillouin gain spectrum, and
      sending at least two probe tones into the optical fiber from another end of the optical fiber, where a frequency spacing between the probe tones is different from the frequency spacing between the pump tones; and
   generating a sensing output based on the interrogating.

2. The method of claim 1, where the frequency spacing between the pump tones comprises equal frequency spacings.

3. The method of claim 1, where the frequency spacing between the pump tones comprises unequal frequency spacings.

4. The method of claim 1, comprising:
   generating a quantity of pump tones such that the frequency spacing between the pump tones is larger than the width of the Brillouin gain spectrum; and
   generating the same quantity of probe tones, such that the frequency separation between a probe tone from among the quantity of generated probe tones and a corresponding pump tone is substantially equal to a Brillouin frequency shift, and the frequency spacing between the probe tones is different from the frequency spacing between the pump tones,
   wherein a spectral resolution of said interrogating is determined by the quantity of pump probes and a difference between the frequency spacing between the pump tones and the frequency spacing between the probe tones.

5. The method of claim 4, comprising specifying the quantity of pump tones as a ratio of a specified dynamic range and the difference between the frequency spacing between the pump tones and the frequency spacing between the probe tones.

6. The method of claim 4, comprising determining the quantity of pump tones such that a lowest pump tone frequency is larger than a highest probe tone frequency.

7. The method of claim 4, comprising determining the quantity of pump tones such that a total frequency range spanned by the pump tones is less than the Brillouin frequency shift.

8. The method of claim 4, comprising determining the quantity of pump tones such that a specified dynamic range for said interrogating is satisfied given the difference between the frequency spacing between the probe tones.

9. The method of claim 4, comprising:
   ascertaining that a dynamic range for said interrogating exceeds a ratio of the Brillouin frequency shift to the frequency spacing between the pump tones;
   in response to said ascertaining, generating the same quantity of probe tones having a second frequency spacing that is different than the initial frequency separation between the quantity of probe tones;
   repeating said interrogating different parts of the Brillouin gain spectrum (BGS) using the quantity of pump tones having the second frequency spacing;
   generating another sensing output based on said repeated interrogating;
   determining that a given probe tone corresponding to the center of the BGS associated with the repeated interrogating is amplified by another instance of the BGS excited by the pump tone that is shifted by n pump frequency spacings from an instance of the BGS excited by the pump tone corresponding to the given probe tone; and
   in response to said determining, shifting a Brillouin gain spectrum corresponding to the initial interrogating by n times a difference between the initial frequency spacing and the second frequency spacing.

10. The method of claim 4, where said sending the at least two pump tones into the optical fiber from one end of the optical fiber comprises simultaneously sending the quantity of pump tones as a pump signal.

11. The method of claim 10, comprising pulsing the pump signal to spatially-resolve said interrogating.

12. The method of claim 11, where said generating the sensing output comprises:
   down shifting output of the interrogating;
   digitizing the down shifted output of the interrogating;
   dividing the digitized output into multiple segments corresponding to pulses of the pump signal;
   for each of the segments, averaging the digitized output to obtain an averaged output for each of the multiple segments;
   applying a Fourier transform to the averaged output of each of the multiple segments;
   determining a Brillouin frequency shift for each of the transformed multiple segments; and
   aggregating the determined Brillouin frequency shifts of the multiple segments into the sensing output.

13. The method of claim 11, where said generating the sensing output comprises:
   down shifting output of the interrogating;
   digitizing the down shifted output of the interrogating;
   dividing the digitized output into multiple segments corresponding to pulses of the pump signal;
   for each of the segments, averaging the digitized output to obtain an averaged output for each of the multiple segments;
   digitally filtering N instances of the averaged output to obtain N filtered outputs for each of the multiple segments;
   determining a Brillouin frequency shift as the largest of the N filtered outputs for each of the multiple segments; and
   aggregating the determined Brillouin frequency shifts of the multiple segments into the sensing output.

14. The method of claim 11, where said generating the sensing output comprises:
   down shifting output of the interrogating;
   RF filtering N instances of the down shifted output of the interrogating to obtain N filtered signals corresponding to the probe tones;
   digitizing the obtained N filtered signals;
   dividing the N digitized filtered signals into multiple segments corresponding to pulses of the pump signal;
   for each of the segments, averaging the N digitized filtered signals to obtain N averaged outputs for each of the multiple segments;
   determining a Brillouin frequency shift as the largest of the N averaged outputs for each of the multiple segments; and
   aggregating the determined Brillouin frequency shifts of the multiple segments into the sensing output.

15. The method of claim 11, where said generating the sensing output comprises:
   down shifting N instances of output of the interrogating by using respective different local optical oscillators to obtain N downshifted outputs of the interrogating corresponding to the probe tones;
   low-pass filtering the N downshifted outputs of the interrogating to obtain N filtered signals;
   digitizing the obtained N filtered signals;
   dividing the N digitized filtered signals into multiple segments corresponding to pulses of the pump signal;
   for each of the segments, averaging the N digitized filtered signals to obtain N averaged outputs for each of the multiple segments;
   determining a Brillouin frequency shift as the largest of the N averaged outputs for each of the multiple segments; and
   aggregating the determined Brillouin frequency shifts of the multiple segments into the sensing output.

16. The method of claim 4, where said generating the quantity of pump tones comprises generating a pump signal comprising a pulse that includes sub-pulses riding on respective ones of the generated quantity of pump tones, such that a sub-pulse period of each of the sub-pulses is substantially equal to a time of round-trip propagation of the sub-pulse through the optical fiber, and the sub-pulses of the pulse are sequenced such that said sending the at least two pump tones into the optical fiber comprises simultaneously sending two of the sub-pulses that correspond to pulse tone frequencies that are symmetric with respect to an optical carrier.

17. A system of sensing using an optical fiber, the system comprising:
   a laser source to produce an optical carrier signal having a carrier frequency;
   an optical splitter to split the optical carrier signal into a first optical signal at the carrier frequency that propagates through a probe arm and a second optical signal at the carrier frequency that propagates through a pump arm, such that the pump arm is arranged to have an end at the optical splitter and another end at a second end of the optical fiber, and the probe arm is arranged to have an end at the optical splitter and another end at a first end of the optical fiber;
   a waveform generator to produce first and second RF comb signals, such that frequency spacings of the first RF comb signal are different from frequency spacings of the second RF comb signal, and the frequency spacings of both RF comb signals are larger than a width of a Brillouin gain spectrum in the optical fiber;
   an optical modulator of the pump arm to modulate the second optical signal using the second RF comb signal and to generate a pump signal including optical pump tones riding on the carrier frequency and corresponding to the second RF comb signal, such that the generated pump signal travels through the pump arm to the second end of the optical fiber, propagates through the optical fiber and excites instances of the Brillouin gain spectrum that are shifted by a Brillouin frequency shift (BFS) of the optical fiber from the corresponding optical pump tones of the pump signal;
   a mixer including a local oscillator (LO) tuned to the approximate BFS of the optical fiber to up-convert the first RF comb signal into an intermediate frequency (IF) comb signal including IF comb tones riding on the Brillouin frequency shift and corresponding to the first RF comb signal;
   an optical modulator of the probe arm to modulate the first optical signal using the IF comb signal and to generate a probe signal including optical probe tones riding on the carrier frequency downshifted by the approximate BFS and corresponding to the IF comb signal, such that the generated probe signal travels through the probe arm to the first end of the optical fiber, propagates through the optical fiber, probes the instances of the Brillouin gain spectrum excited in the optical fiber by the optical pump tones of the pump signal, and exits at the second end of the optical fiber as an amplified probe signal including amplified probe tones riding on the downshifted carrier frequency and corresponding to the IF comb signal;
   an optical circulator to extract the amplified probe signal from the second end of the optical fiber; and
   a detection system to detect the amplified probe signal extracted by the circulator from the second end of the optical fiber, the detection system being configured to convert the detected amplified probe signal to a data signal corresponding to the Brillouin gain spectrum associated with the optical fiber.

18. The system of claim 17, where the second RF comb signal is generated such that the second frequency spacing between the optical pump tones comprises equal frequency spacings.

19. The system of claim 17, where the second RF comb signal is generated such that the second frequency spacing between the optical pump tones comprises unequal frequency spacings.

20. The system of claim 17, where a spectral resolution of the system is determined by a quantity of pump probes and a difference between the second frequency spacing between the pump tones and the first frequency spacing between the probe tones.

21. The system of claim 17, where a quantity of pump tones is determined as a ratio of a specified dynamic range and the difference between the second frequency spacing between the pump tones and the first frequency spacing between the probe tones.

22. The system of claim 17, where a quantity of pump tones is specified such that the lowest pump tone frequency is larger than the highest probe tone frequency.

23. The system of claim 17, where a quantity of pump tones is specified such that a total frequency range spanned by the pump tones is less than the Brillouin frequency shift.

24. The system of claim 17, where the optical pump tones of the pump signal simultaneously excite the instances of the Brillouin gain spectrum in the optical fiber.

25. The system of claim 24, where the pump signal is pulsed to spatially-resolve the Brillouin gain spectrum associated with the optical fiber.

26. The system of claim 25, where the detection system includes:
- a detector and a local oscillator to down shift the detected amplified probe signal;
- analog-to-digital convertor to digitize the down shifted amplified probe signal; and
- processing electronics configured to
  - divide the digitized output into multiple segments corresponding to pulses of the pump signal,
  - for each of the multiple segments, average the digitized output to obtain an averaged output for each of the multiple segments,
  - apply a Fourier transform to the averaged output of each of the multiple segments,
  - determine a value of the Brillouin frequency shift for each of the transformed multiple segments, and
  - aggregate the determined Brillouin frequency shifts of the multiple segments into the data signal.

27. The system of claim 25, where the detection system includes:
- a detector and a local oscillator to down shift the detected amplified probe signal;
- analog-to-digital convertor to digitize the down shifted amplified probe signal; and
- processing electronics configured to
  - divide the digitized output into multiple segments corresponding to pulses of the pump signal,
  - for each of the multiple segments, average the digitized output to obtain an averaged output for each of the multiple segments,
  - digitally filter N instances of the averaged output to obtain N filtered outputs for each of the multiple segments,
  - determine a Brillouin frequency shift as the largest of the N filtered outputs for each of the multiple segments, and
  - aggregate the determined Brillouin frequency shifts of the multiple segments into the data signal.

28. The system of claim 25, where the detection system includes:
- a detector and a local oscillator to down shift the detected amplified probe signal;
- N RF filters to filter N instances of the down shifted amplified probe signal to obtain N filtered signals corresponding to the probe tones;
- analog-to-digital convertor to digitize the obtained N filtered signals; and
- processing electronics configured to
  - divide the N digitized filtered signals into multiple segments corresponding to pulses of the pump signal,
  - for each of the multiple segments, average the N digitized filtered signals to obtain N averaged outputs for each of the multiple segments,
  - determine a Brillouin frequency shift as the largest of the N averaged outputs for each of the multiple segments, and
  - aggregate the determined Brillouin frequency shifts of the multiple segments into the data signal.

29. The system of claim 25, where the detection system includes:
- N local oscillators tuned to respective probe tone frequencies;
- N detectors to down shift, using the N local oscillators, N instances of the detected amplified probe signal to obtain N downshifted output signals;
- N low-pass filters to filter the N down shifted output signals to obtain N filtered signals corresponding to the probe tones;
- analog-to-digital convertor to digitize the obtained N filtered signals; and
- processing electronics configured to
  - divide the N digitized filtered signals into multiple segments corresponding to pulses of the pump signal,
  - for each of the multiple segments, average the N digitized filtered signals to obtain N averaged outputs for each of the multiple segments,
  - determine a Brillouin frequency shift as the largest of the N averaged outputs for each of the multiple segments, and
  - aggregate the determined Brillouin frequency shifts of the multiple segments into the data signal.

30. The system of claim 17, where the waveform generator produces a pulse that includes sub-pulses riding on respective ones of the optical pump tones, such that a sub-pulse period of each of the sub-pulses is substantially equal to a round-trip time of propagation of the sub-pulse through the optical fiber, and the sub-pulses of the pulse are sequenced such that two optical pump tones at-a-time excite two instances of the Brillouin gain spectrum in the optical fiber, where the two of the sub-pulses have pulse tone frequencies that are symmetric with respect to the optical carrier.

* * * * *